(12) United States Patent
Van Cleave et al.

(10) Patent No.: US 8,271,304 B1
(45) Date of Patent: *Sep. 18, 2012

(54) SYSTEM AND METHOD OF PROVIDING PRICING INFORMATION

(75) Inventors: Robert Jackson Van Cleave, San Antonio, TX (US); James Steven Kuhn, Helotes, TX (US); Karen Marie Moritz, Fair Oaks Ranch, TX (US); Steven Carl Mills, San Antonio, TX (US); Myron Leo Dye, San Antonio, TX (US); Larry Wayne Clark, San Antonio, TX (US); David Ray Pawelek, Pleasanton, TX (US)

(73) Assignee: United Services Automobile Association, San Antonio, TX (US)

( * ) Notice: Subject to any disclaimer, the term of this patent is extended or adjusted under 35 U.S.C. 154(b) by 140 days.

This patent is subject to a terminal disclaimer.

(21) Appl. No.: 12/727,874

(22) Filed: Mar. 19, 2010

Related U.S. Application Data

(63) Continuation of application No. 10/677,763, filed on Oct. 2, 2003, now Pat. No. 7,707,049.

(60) Provisional application No. 60/415,408, filed on Oct. 2, 2002.

(51) Int. Cl.
*G06Q 40/00* (2012.01)
(52) U.S. Cl. ......................................................... 705/4
(58) Field of Classification Search ........................ None
See application file for complete search history.

(56) References Cited

U.S. PATENT DOCUMENTS

| | | | |
|---|---|---|---|
| 4,831,526 A | 5/1989 | Luchs et al. | |
| 5,797,134 A | 8/1998 | McMillan et al. | |
| 5,809,478 A | 9/1998 | Greco et al. | |
| 6,154,731 A | 11/2000 | Monks et al. | |
| 6,182,048 B1 | 1/2001 | Osborn et al. | |
| 6,272,528 B1 | 8/2001 | Cullen et al. | |
| 7,707,049 B2 | 4/2010 | Van Cleave et al. | |
| 2001/0023404 A1 | 9/2001 | Ogawa et al. | |
| 2002/0026334 A1 | 2/2002 | Igoe | |
| 2002/0035484 A1 | 3/2002 | McCormick | |
| 2002/0046053 A1 | 4/2002 | Hare et al. | |
| 2002/0046064 A1 | 4/2002 | Maury et al. | |
| 2002/0046144 A1 | 4/2002 | Graff | |
| 2002/0052765 A1 | 5/2002 | Taylor | |

FOREIGN PATENT DOCUMENTS

WO WO-0139090 A1 5/2001

OTHER PUBLICATIONS

"U.S. Appl. No. 10/677,763, Examiner Interview Summary mailed Aug. 5, 2009", 2 pgs.

(Continued)

*Primary Examiner* — Valerie Lubin
(74) *Attorney, Agent, or Firm* — Schwegman Lundberg Woessner P.A.

(57) ABSTRACT

The present invention provides a system and method capable of providing an estimated premium without extensive and repetitive questioning. The present invention utilizes unique assumptions to dramatically reduce the amount of information that must be provided by the customer. In one embodiment, the present invention utilizes a mainframe computer system, an application server, and an external rules management system to interact with the customer via an attractive graphic user interface. Once logged onto the website of the present invention, the customer may choose to engage in a fast quote process which utilizes assumptions, driver information, and vehicle information to assess the risk associated with insuring the customer and then calculates an estimated cost to insure.

20 Claims, 34 Drawing Sheets

OTHER PUBLICATIONS

"U.S. Appl. No. 10/677,763, Final Office Action mailed Dec. 9, 2008", 10 pgs.

"U.S. Appl. No. 10/677,763, Non-Final Office Action mailed Apr. 29, 2009", 12 pgs.

"U.S. Appl. No. 10/677,763, Non-Final Office Action mailed Jun. 26, 2008", 9 pgs.

"U.S. Appl. No. 10/677,763, Non-Final Office Action mailed Dec. 9, 2009", 7 pgs.

"U.S. Appl. No. 10/677,763, Response filed Aug. 31, 2009 to Non-Final Office Action mailed Apr. 29, 2009", 12 pgs.

"U.S. Appl. No. 10/677,763, Response filed Mar. 9, 2009 to Final Office Action mailed Dec. 9, 2008", 12 pgs.

"U.S. Appl. No. 10/677,763, Response filed Sep. 26, 2008 to Non-Final Office Action mailed Jun. 26, 2008", 12 pgs.

FILE EDIT VIEW FAVORITES TOOLS HELP
BACK FORWARD STOP REFRESH HOME SEARCH FAVORITES HISTORY MAIL PRINT EDIT DISCUSS PHONE
ADDRESS:
LINKS: ☐CARCO ☐CUSTOMIZED LINKS ☐DEFAULT ☐FREE HOTMAIL ☐MICROSOFT ☐ONLINE REFERENCE LIBRARY ☐PRODUCT NEWS ☐TERRITORY ANALYSIS ☐TODAY'S LINKS

FAVORITES
☐ ADD... ☐ ORGANIZE...
☐ CHANNELS
☐ ICP
☐ LINKS
☐ SOFTWARE UPDATES
☐ @USAA--OUR ELECTRO...
☐ ABA BMX-THE W...
☐ AREA
☐ AUTO TEST
☐ AUTOMOBILE INSPECTION...
☐ CARCO'S HOME PAGE
☐ GICNOW! DIRECTORY
☐ LONESTAR BMX TRACK
☐ NEW MEMBER SALES H...
☐ NEW_JERSEY_QUICK_...
☐ NWS WEBSITE
☐ OLD CARS AND FOREIGN V...
☐ USA MAP PROFILE LOOK...
☐ P&C UNDERWRITING AND...
☐ PERSONAL
☐ USAA HELP DESK
☐ SAN ANGELO TX WEA...
☐ STATE AND LOCAL GROVE...
☐ THE WEATHER CHANNEL...

SELECT   DRIVER
☐ ONE SALSA
☐ TWO SALSA
☐ THREE SALSA
☐ FOUR SALSA

SELECT [▼] NUMBER OF ADDITIONAL DRIVERS NOT LISTED ABOVE

ACCIDENTS & MOVING VIOLATIONS
DO YOU OR ANY DRIVERS ON THIS QUOTE HAVE ANY ACCIDENTS OR MOVING VIOLATIONS ?
○ YES ○ NO
HAS ANY OPERATOR INCLUDED IN THIS QUOTE HAD ANY DRUG OR ALCOHOL RELATED INCIDENTS?
○ YES ○ NO
DOES ANY OPERATOR INCLUDED IN THIS QUOTE REQUIRE A FINANCIAL RESPONSIBILITY FORM (SR-22) ?
○ YES ○ NO

VEHICLES
ARE ALL VEHICLES YOU PLAN TO QUOTE LESS THAN 15 YEARS OLD?
○ YES ○ NO
ARE ALL THE VEHICLES YOU PLAN TO QUOTE CARS, TRUCKS OR VANS?
○ YES ○ NO
SELECT ALL HOUSEHOLD VEHICLES
SELECT [▼] NUMBER OF VEHICLES

DONE

Fig. 6C

ARE ALL VEHICLES YOU PLAN TO QUOTE LESS THAN 15 YEARS OLD?
○ YES ○ NO

ARE ALL VEHICLES YOU PLAN TO QUOTE CARS, TRUCKS OR VANS?
○ YES ○ NO

SELECT ALL HOUSEHOLD VEHICLES.
280 — SELECT ▼  NUMBER OF VEHICLES

VEHICLE LOCATION
CITY:      WESTERVILLE
STATE:     OHIO           [CHANGE] CHANGE TO A DIFFERENT STATE
ZIP CODE:  43801 + 2658 (+4 OPTIONAL)
COUNTY:    SELECT ▼

WITHIN CITY LIMITS ○ YES ○ NO

ARE ALL THE VEHICLES LOCATED AT THE SAME ADDRESS?
○ YES ○ NO

[FAQS] [CONTACT US] [HOME]          [EXIT] [NEXT]

TO TOP △

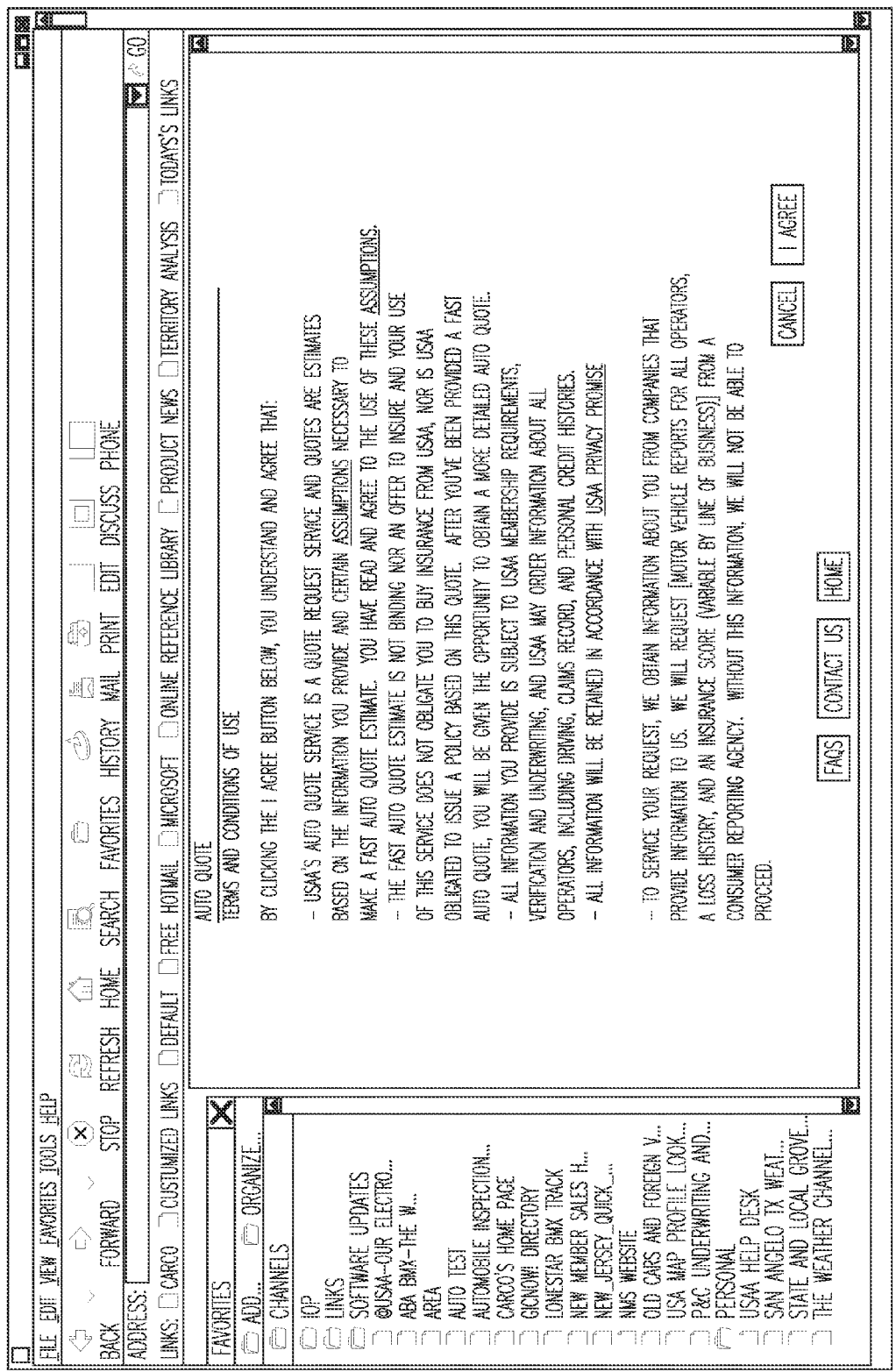

Fig. 8A

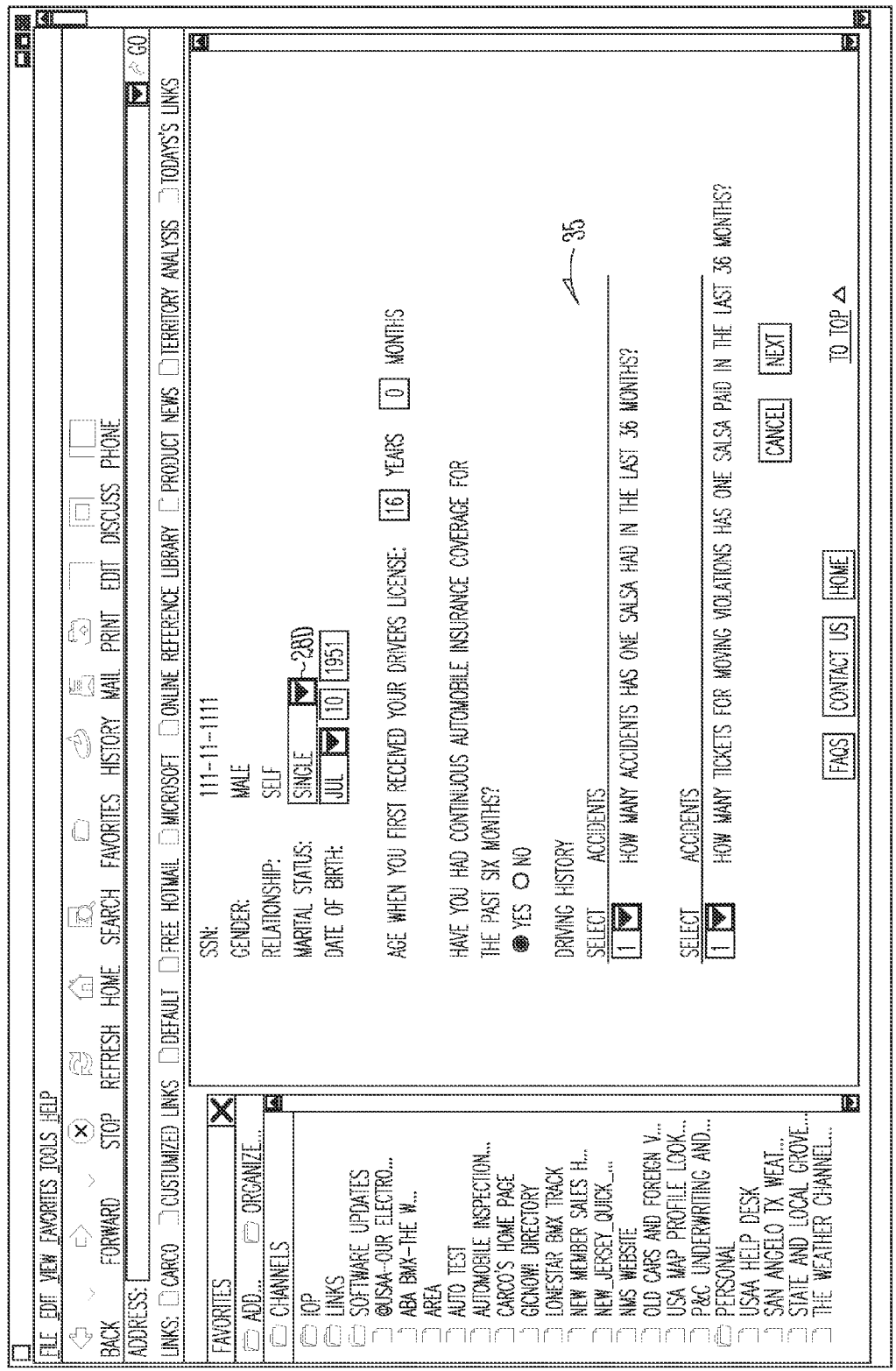

UNINSURED MOTORISTS BODILY INJURY
   LIMIT: 12,500/25,000 PER PERSON/PER ACCIDENT
MEDICAL PAYMENTS
   LIMIT: 1,000 PER PERSON
EXTENDED BENEFITS
   SELECTION: COVERAGE DECLINED
WAGE EARNER DISABILITY BENEFITS
   SELECTION: COVERAGE DECLINED
ESSENTIAL SERVICES DISABILITY BENEFITS
   LIMIT: COVERAGE DECLINED
DEATH BENEFIT
   LIMIT: COVERAGE DECLINED

VEHICLE LEVEL COVERAGE
1998 SUBARU LEGACY 2.5 GT
COMPREHENSIVE
   DEDUCTIBLE: 500 PER OCCURRENCE
COLLISION
   DEDUCTIBLE: 500 PER OCCURRENCE
UNINSURED MOTORISTS PROPERTY DAMAGE
   LIMIT: COVERAGE DECLINED
   DEDUCTIBLE: COVERAGE DECLINED

Fig. 10A

YOUR AUTO POLICY SERVICE CENTER

SOME OF YOUR QUOTES MAY NOT BE AVAILABLE. PLEASE CONTACT US IF YOU HAVE ANY QUESTIONS. QUOTES WILL BE SAVED FOR 30 DAYS. SUBMIT A QUOTE FOR PROCESSING OR CREATE A NEW QUOTE

QUOTES

USING THIS QUOTE REQUEST SERVICE DOES NOT OBLIGATE YOU TO BUY AUTOMOBILE INSURANCE FROM USAA, AND USAA IS NOT OBLIGATED TO ISSUE AN AUTOMOBILE INSURANCE POLICY BASED ON THIS QUOTE. ALL INFORMATION IS SUBJECT TO USAA MEMBERSHIP REQUIREMENTS, VERIFICATION AND UNDERWRITING. BY APPLYING FOR AUTOMOBILE INSURANCE FROM USAA, YOU AGREE THAT USAA MAY ORDER CONSUMER REPORTS AND INFORMATION ABOUT CLAIMS AND PERSONAL CREDIT HISTORIES. ALL INFORMATION WILL BE KEPT CONFIDENTIAL BUT MAY BE SHARED WITH USAA AFFILIATES.

QUOTES
BELOW ARE THE QUOTES THAT HAVE BEEN CALCULATED BASED UPON YOUR PAST ENTRIES.
RECENT QUOTES

| QUOTE | ESTIMATED PREMIUM TOTAL | ACT ON THIS QUOTE |
|---|---|---|
| AUTO QUOTE | | GET A DETAILED QUOTE |
| LOCATION: OHIO | TOTAL PREMIUM $284.49 | CHANGE DRIVERS, VEHICLES OR LOCATION |
| QUOTE DATE- | FIRST PAYMENT $46.63 | CHANGE COVERAGES |
| 07/31/03 07:20:58 AM | ESTIMATED MONTHLY PAYMENT $39.64 | CONTACT ME |
| | | VIEW PREMIUM DETAILS |
| | | VIEW QUOTE |

FILE EDIT VIEW FAVORITES TOOLS HELP
BACK FORWARD STOP REFRESH HOME SEARCH FAVORITES HISTORY MAIL PRINT EDIT DISCUSS PHONE
ADDRESS:
LINKS: ☐CARGO ☐CUSTOMIZED LINKS ☐DEFAULT ☐FREE HOTMAIL ☐MICROSOFT ☐ONLINE REFERENCE LIBRARY ☐PRODUCT NEWS ☐TERRITORY ANALYSIS ☐TODAY'S LINKS

FAVORITES
☐ADD... ☐ORGANIZE...
☐CHANNELS
☐IOP
☐LINKS
☐SOFTWARE UPDATES
☐@USAA-OUR ELECTRO...
☐ABA BMX-THE W...
☐AREA
☐AUTO TEST
☐AUTOMOBILE INSPECTION...
☐CARGO'S HOME PAGE
☐GICNOW! DIRECTORY
☐LONESTAR BMX TRACK
☐NEW MEMBER SALES H...
☐NEW_JERSEY_QUICK_...
☐NMS WEBSITE
☐OLD CARS AND FOREIGN V...
☐USA MAP PROFILE LOOK...
☐P&C UNDERWRITING AND...
☐PERSONAL
☐USAA HELP DESK
☐SAN ANGELO TX WEAT...
☐STATE AND LOCAL GOVE...
☐THE WEATHER CHANNEL...

DEDUCTIBLE: 500 PER OCCURRENCE $132.05
UNINSURED MOTORISTS PROPERTY DAMAGE
SELECTION: COVERAGE DECLINED $0.00
RENTAL REIMBURSEMENT
LIMIT: 30/900 PER DAY/MAXIMUM $21.60
TOWING & LABOR
SELECTION: COVERAGE SELECTED $6.00

VEHICLE SUBTOTAL $284.49

SIX MONTH TOTAL POLICY PREMIUM $284.49

— I UNDERSTAND THAT USAA PROPERTY AND CASUALTY INSURANCE PRODUCTS, INCLUDING AUTO INSURANCE, ARE AVAILABLE ONLY TO PERSONS WHO MEET USAA'S ELIGIBILITY REQUIREMENTS. I AFFIRM THAT I AM CURRENTLY ELIGIBLE FOR USAA PROPERTY AND CASUALTY PRODUCTS.

— I UNDERSTAND THAT THIS INFORMATION WILL BE REVIEWED AND RELIED UPON BY USAA TO ISSUE THE POLICY.

— I UNDERSTAND THIS FORM SHALL BECOME PART OF MY RECORD WITH USAA AND THAT USAA RESERVES THE RIGHT TO VERIFY THIS INFORMATION WITH OTHER SOURCES.

[NEXT]

[FAQS] [CONTACT US] [HOME]

TO TOP △

Fig. 11

USAA

FILE EDIT VIEW FAVORITES TOOLS HELP

NAMED INSURED  MEMBER#   ELIGIBILITY                ADDRESS AS
ONE MUSTARD    1581071   NON-COMMISSIONED OFFICER   SERGEANT

GET AN AUTO QUOTE FOR OHIO

GETTING STARTED                                          TO BOTTOM ▽

DRIVERS

SELECT ALL LICENSED, DEPENDENT HOUSEHOLD MEMBERS.

SELECT DRIVER                                 REFRESH FROM CBT      84  HELP
☒ ONE MUSTARD                                                       CITY/COUNTY
☒ TWO MUSTARD
☐ TEST CASE GAAAJJBEA
☐ TEST CASE GAAAJJBEB
☐ OH M GOSH
☐ HERE WE GO
[SELECT ▼]  NUMBER OF ADDITIONAL DRIVERS NOT LISTED ABOVE

VEHICLES
SELECT ALL HOUSEHOLD VEHICLES.

28D— [1 ▼] NUMBER OF VEHICLES

VEHICLE LOCATION
CITY: [MIDDLETOWN]

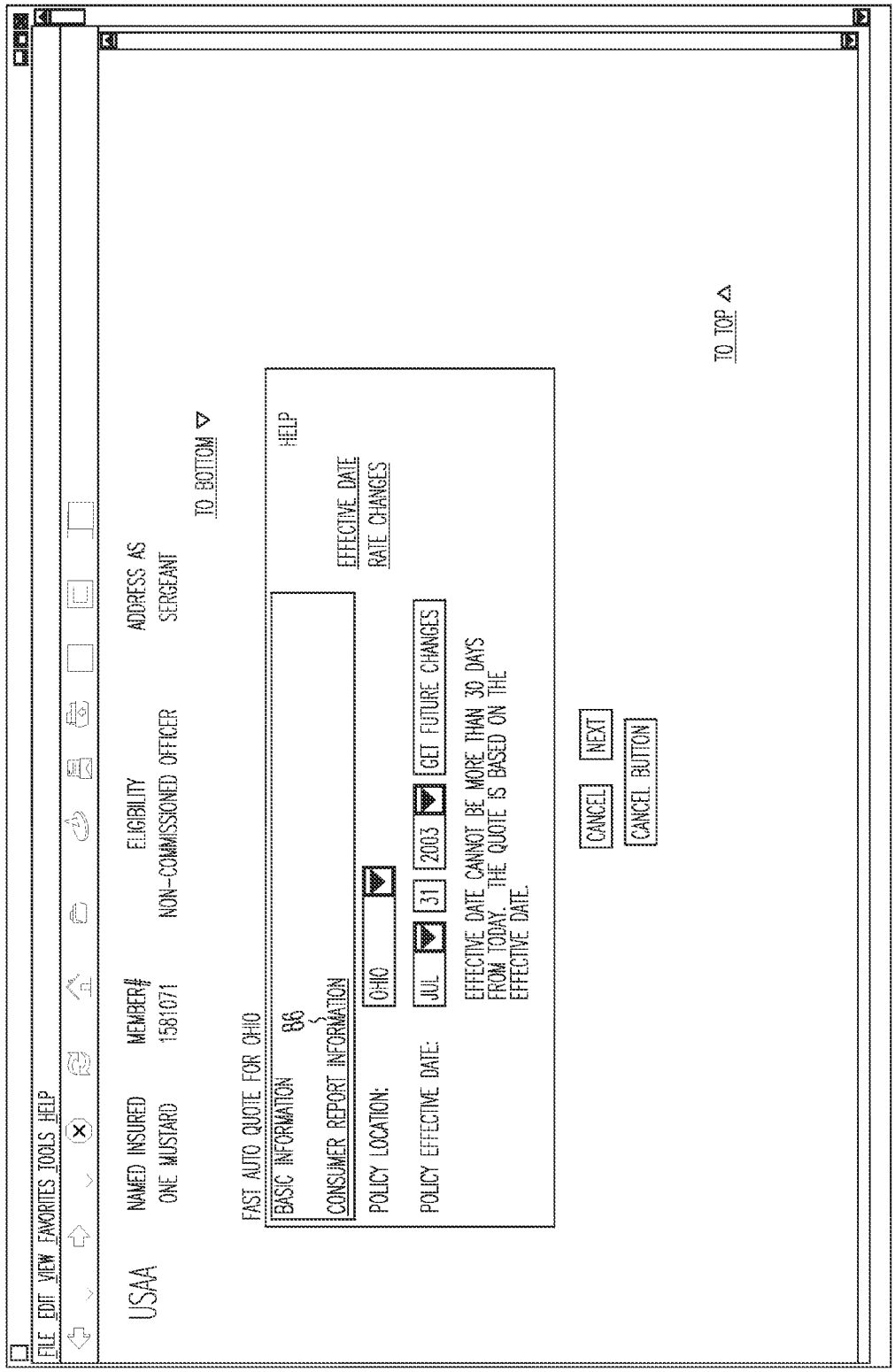

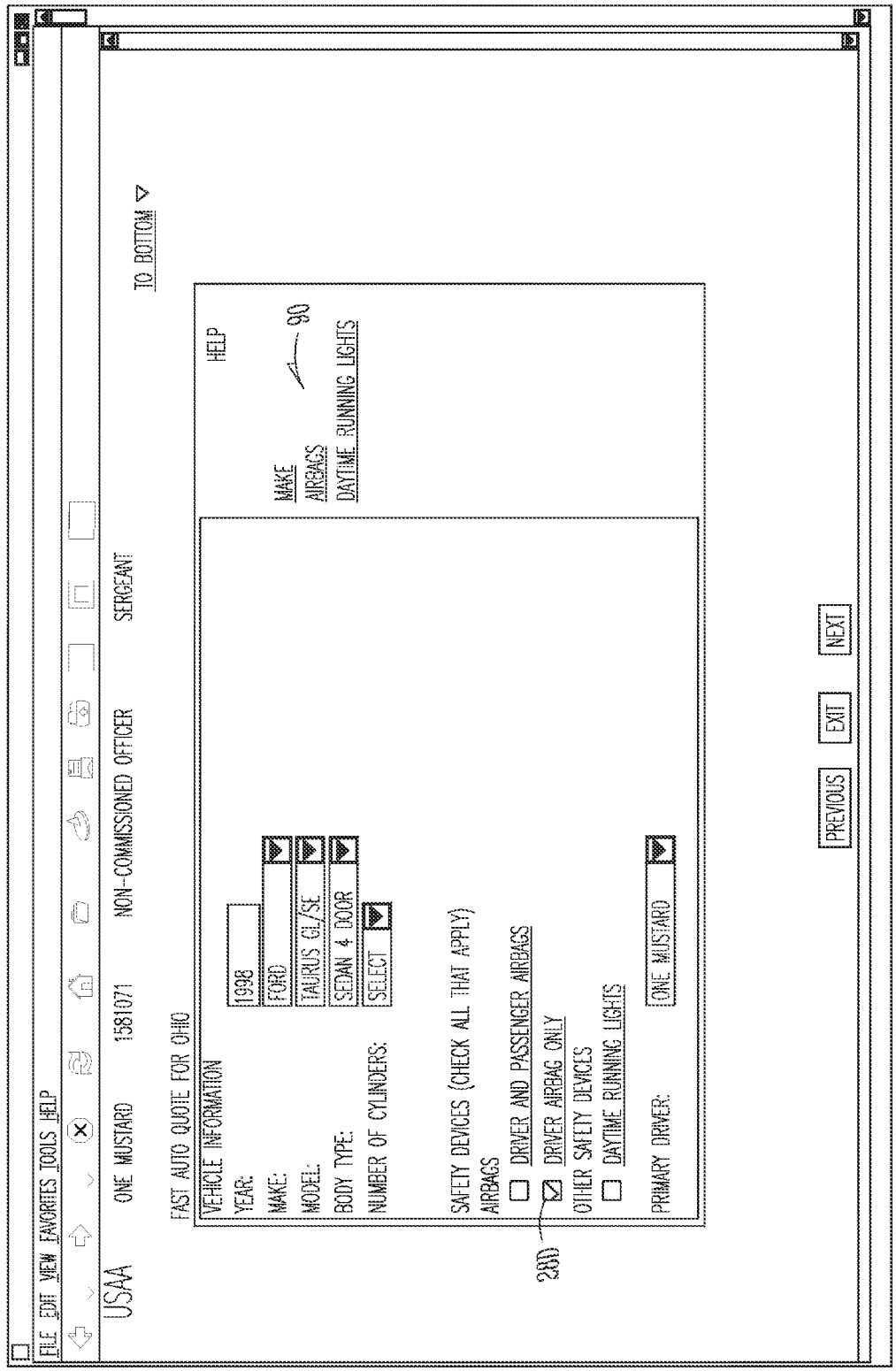

Fig. 15

USAA

| FILE EDIT VIEW FAVORITES TOOLS HELP |
|---|
| NAMED INSURED: ONE MUSTARD | MEMBER #: 1581071 | ELIGIBILITY: NON-COMMISSIONED OFFICER | ADDRESS AS: SERGEANT |

FAST AUTO QUOTE FOR OHIO

RISK PROFILE

RISK DECISION: STANDARD

DESCRIPTION: CL_HH, EX_NI, FR_STB, MARG-PR_PR CLEAN HOUSEHOLD DRIVING RECORD,

EXPLANATION: EXPERIENCED NAMED INSURED, FAIR STABILITY, MARGINAL – POOR PRIOR INSURANCE

RISK COMPANY: USAA
RISK TIER: 3B
RISK PROFILE ID: 1014
STATE: OH

HELP

TO BOTTOM ▽

PREVIOUS   EXIT   NEXT

TO TOP △

28

92

```
┌──────────────────────────────────────────────────────────────────────┐
│ FILE EDIT VIEW FAVORITES TOOLS HELP                                  │
│  ←  →  ⊗  ⟳  ⌂  ▭  ⛵  🖨  💾  ▭  ▭  ▭                               │
│   USAA    NAMED INSURED   MEMBER#      ELIGIBILITY       ADDRESS AS  │
│           ONE MUSTARD     1581071   NON-COMMISSIONED OFFICER SERGEANT│
│                                                          TO BOTTOM ▽ │
│ FAST AUTO QUOTE FOR OHIO                                             │
│  ┌─────────────────────────────────────────────────┐         HELP    │
│  │ COVERAGE PACKAGES                               │  BODILY INJURY  │
│  │ PLEASE CLICK ON THE TABS TO COMPARE THE COVERAGE PACKAGES.       │
│  │ FOR SPECIFIC COVERAGE LIMITS, SELECT "CUSTOM".  │  PROPERTY DAMAGE│
│  │                                           94 ↙  │                 │
│  │ ╱MINIMUM╲╱STANDARD╲╱SUPERIOR╲╱CUSTOM╲           │  UNINSURED MOTORISTS│
│  │                                                 │  BODILY INJURY  │
│  │ CLICK "CALCULATE" TO GET A QUOTE FOR THIS PACKAGE. [CALCULATE]   │
│  │                                                 │  UNINSURED MOTORISTS│
│  │ POLICY LEVEL COVERAGE   ╱─ 39                   │  PROPERTY DAMAGE│
│  │ BODILY INJURY                                   │                 │
│  │   LIMIT:         28D) [SELECT  ▼] PER PERSON/ACCIDENT  MEDICAL PAYMENTS│
│  │ PROPERTY DAMAGE                                 │  EXTENDED BENEFITS│
│  │   LIMIT:              [SELECT  ▼] PER ACCIDENT  │                 │
│  │ UNINSURED MOTORISTS BODILY INJURY               │  COMPREHENSIVE  │
│  │   LIMIT:              [SELECT  ▼] PER PERSON/ACCIDENT  COLLISION  │
│  │ MEDICAL PAYMENTS                                │                 │
│  │   LIMIT:              [SELECT  ▼] PER PERSON    │  RENTAL REIMBURSEMENT│
│  │ EXTENDED BENEFITS                               │  TOWING & LABOR │
│  │   IF EXTENDED BENEFITS COVERAGE IS SELECTED. MEDICAL PAYMENTS     │
│  │   COVERAGE MUST ALSO BE SELECTED.               │                 │
│  └─────────────────────────────────────────────────┘                 │
└──────────────────────────────────────────────────────────────────────┘
```

*Fig. 15A*

SELECTION: [SELECT ▼]

WAGE EARNER DISABILITY BENEFITS
 IF EXTENDED BENEFITS COVERAGE IS SELECTED, A WAGE EARNER
 DISABILITY LIMIT MUST ALSO BE SELECTED.
 LIMIT: [SELECT ▼] MAXIMUM PER PERSON PER 30 DAYS

ESSENTIAL SERVICES DISABILITY BENEFITS
 THIS COVERAGE IS INCLUDED WHEN EXTENDED BENEFITS COVERAGE IS SELECTED.
 LIMIT: [45] PER PERSON PER WEEK

DEATH BENEFIT
 THIS COVERAGE IS INCLUDED WHEN EXTENDED BENEFITS COVERAGE IS SELECTED.
 LIMIT: [5,000] PER PERSON

VEHICLE LEVEL COVERAGES
1995 FORD TAURUS GL / SE
 COMPREHENSIVE
  DEDUCTIBLE: [SELECT ▼] PER OCCURRENCE

COLLISION
  COMPREHENSIVE COVERAGE MUST BE SELECTED TO CARRY THIS COVERAGE.
  DEDUCTIBLE: [SELECT ▼] PER OCCURRENCE

UNINSURED MOTORISTS PROPERTY DAMAGE
  IF COLLISION COVERAGE IS SELECTED, UNINSURED MOTORISTS PROPERTY
  DAMAGE COVERAGE IS NOT AVAILABLE.
  LIMIT: 28D [SELECT ▼] PER ACCIDENT
  DEDUCTIBLE [SELECT ▼] PER ACCIDENT

RENTAL REIMBURSEMENT
  COMPREHENSIVE COVERAGE MUST BE SELECTED TO CARRY THIS COVERAGE.
  LIMIT: [SELECT ▼] PER DAY/MAXIMUM

TOWING & LABOR
  SELECTION: [SELECT ▼]

[EXIT] [CALCULATE]

USAA

FILE EDIT VIEW FAVORITES TOOLS HELP

NAMED INSURED      MEMBER#       ELIGIBILITY                ADDRESS AS
ONE MUSTARD        1581071       NON-COMMISSIONED OFFICER   SERGEANT

GET AN AUTO QUOTE FOR OHIO
PAYMENT PLAN DETAILS                                          TO BOTTOM ▽

| QUOTE | PACKAGE | TOTAL($) | PAYMENT | DATE/TIME | STATE |
|---|---|---|---|---|---|
| #1 | STANDARD PACKAGE | PREMIUM $398.38 | $0.00 FIRST PAYMENT | 07/30/03 05:11:31 PM | OH |

LOCATION: OH    COMPANY: USAA    TIER: 3B    EFFECTIVE DATE: 10/31/03

UNCOLLECTED CHARGES $0.00
FIRST PAYMENT OF 00% +$0.00
$0.00

AMOUNT REQUIRED TO ISSUE:                                    OCTOBER 10, 2003
DO YOU WANT TO OVERRIDE FIRST PAYMENT?
○ YES  ● NO                    TOTAL PREMIUM       $398.38
FIRST BILLING DATE             FIRST PAYMENT        -$0.00
                               PREMIUM REMAINING   $398.38
REGULAR PAYMENT PLAN
4 PAYMENTS

HELP

METHODS OF PAYMENT

SYSTEM AND METHOD OF PROVIDING PRICING INFORMATION

This patent application is a continuation of U.S. application Ser. No. 10/677,763, filed on Oct. 2, 2003, and entitled "SYSTEM AND METHOD OF PROVIDING PRICING INFORMATION", and claims priority to provisional application entitled "Fast Quote", Ser. No. 60/415,408, having a filing date of Oct. 2, 2002.

FIELD OF THE INVENTION

The present invention relates generally to electronic commerce and, more particularly, to a system and method of providing an on-line, real-time quote for one or more insurance products.

BACKGROUND OF THE INVENTION

In order to acquire many types of products, it is often necessary for a potential customer to first provide information to the product provider. This information enables the provider to decide whether or not providing the product to the potential customer is a reasonable business risk. For example, an individual or company who desires to obtain insurance usually must complete a paper application, disclosing the person's name, address, and other information.

Using this information, one or more persons employed by or acting on behalf of the company performs a manual underwriting process, in which the representative makes a decision whether or not to offer the requested insurance to the individual. In some cases, the representative requires the individual to provide additional information or to submit to a vehicle inspection during the underwriting process.

If insurance will be offered, a representative calculates a premium payment, and prepares a quote for the individual's review. If the quote appears accurate and acceptable to the individual, a representative prepares a contract. Once signed, the contract is binding, and coverage will be enforced as of a specified coverage date.

Known on-line quoting tools for insurance products typically require an extensive time commitment on the part of the consumer. Specifically, known systems require the user to review and respond to dozens of questions prior to receiving an estimate of the insurance premium. Such systems make it time consuming for the customer to review a large number of e-commerce sites offering insurance products in order to comparison shop. Thus, there remains a need for a system and method capable of providing an accurate insurance quote without the burdensome and time consuming information gathering required by known systems.

SUMMARY OF THE INVENTION

Accordingly, the present invention provides a system and method capable of providing an estimated premium without extensive and repetitive questioning. The present invention utilizes unique assumptions to dramatically reduce the amount of information that must be provided by the customer. In one embodiment, existing customer data is analyzed to determine which assumptions would apply to the greatest number of potential customers. This feature of the present invention allows the system to provide an accurate quote to a large percentage of potential customers.

In one embodiment, the present invention utilizes a mainframe computer system, an application server, and an external rules management system to interact with the customer via an attractive graphic user interface. Once logged onto the website of the present invention, the customer may choose to engage in the fast quote process, if they are eligible. The fast quote process of the present invention utilizes assumptions, driver information, and vehicle information to assess the risk associated with insuring the customer and calculate an estimated cost to insure. In one embodiment, the external rules management system allows the present invention to maintain and update both the representative interface and the customer interface without interruption of customer access.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing; it being understood that the drawings contained herein are not necessarily drawn to scale; wherein:

Figure 6A:
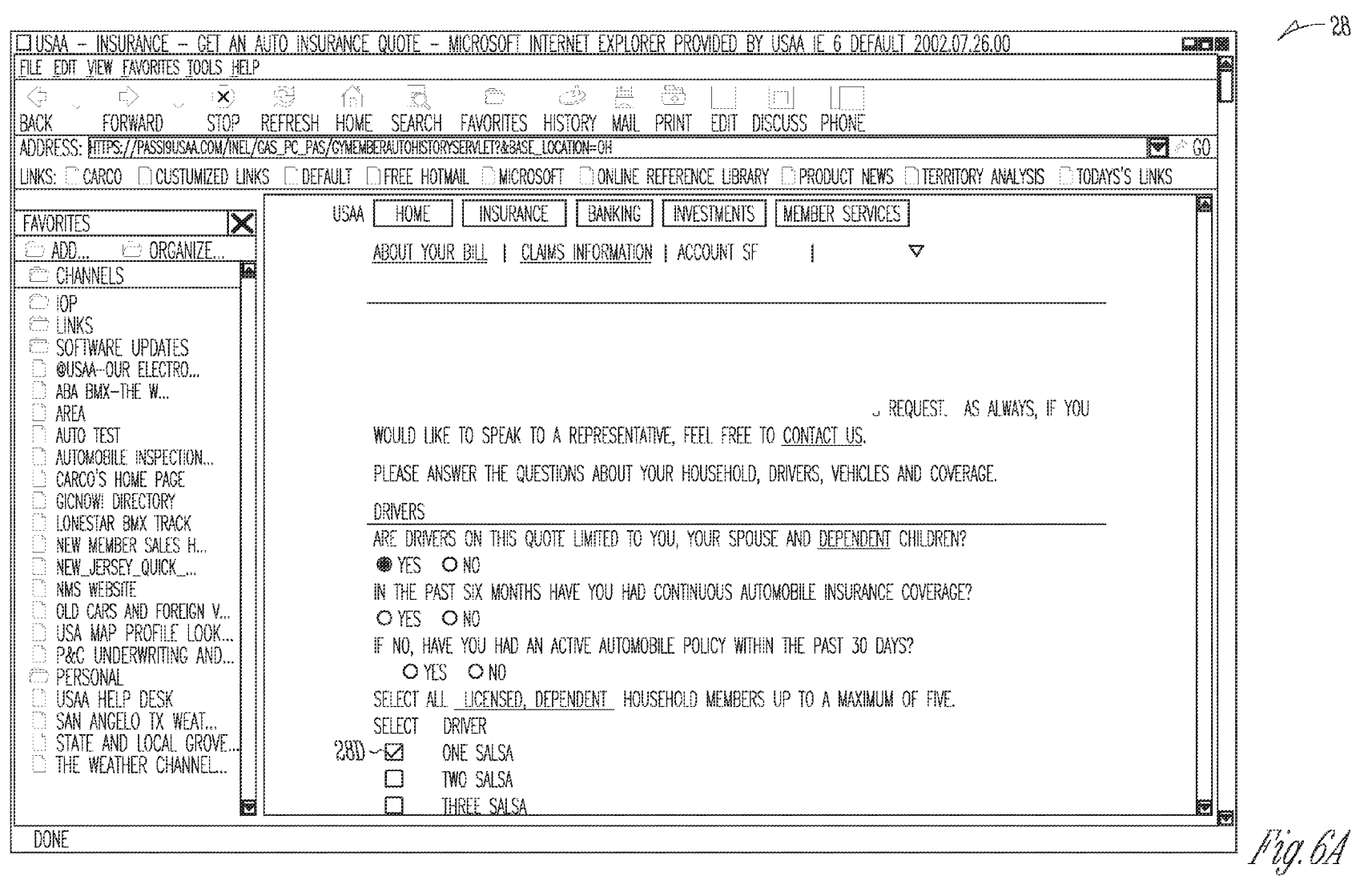
Figure 8A:
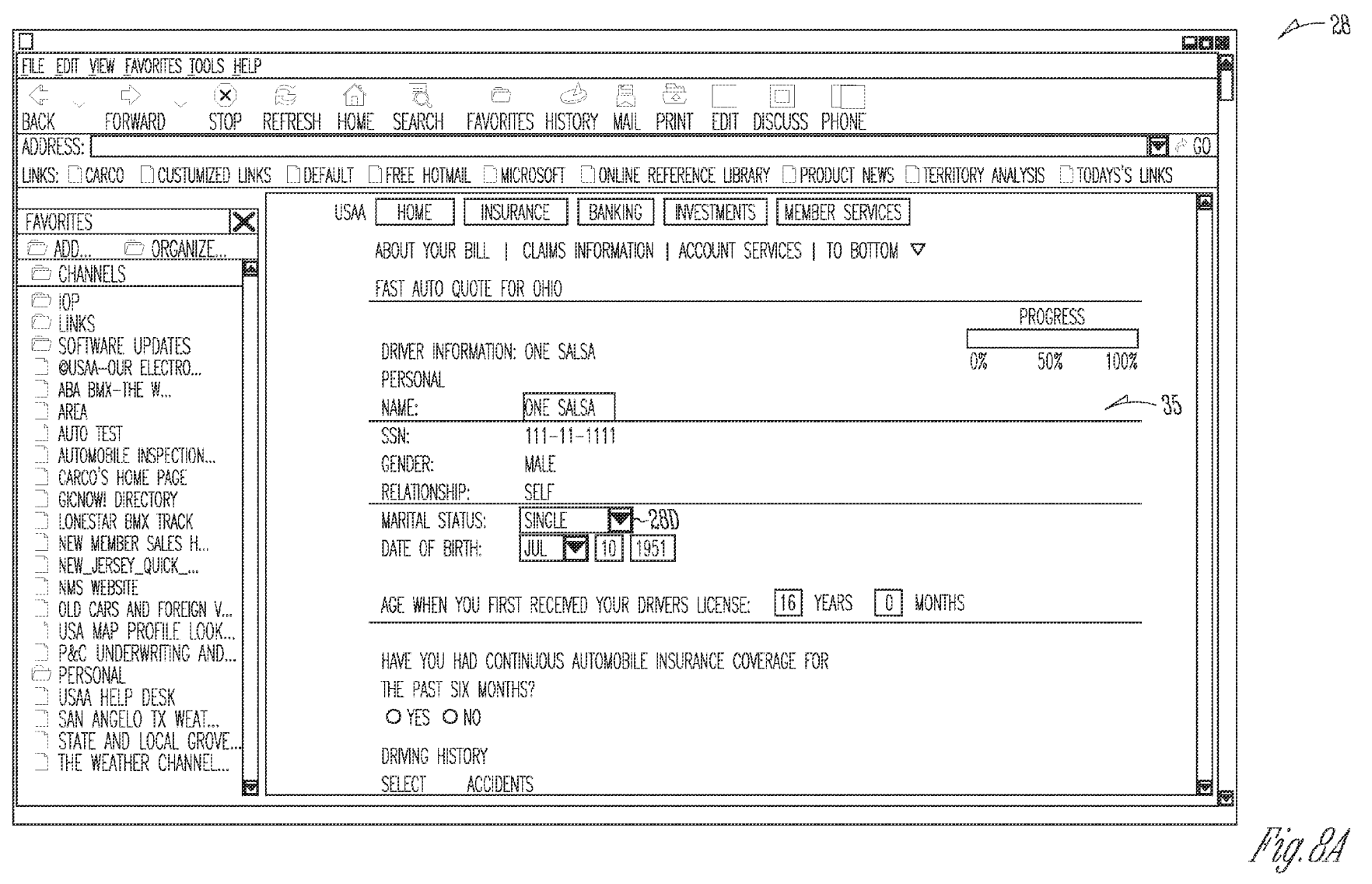
Figure 9A:
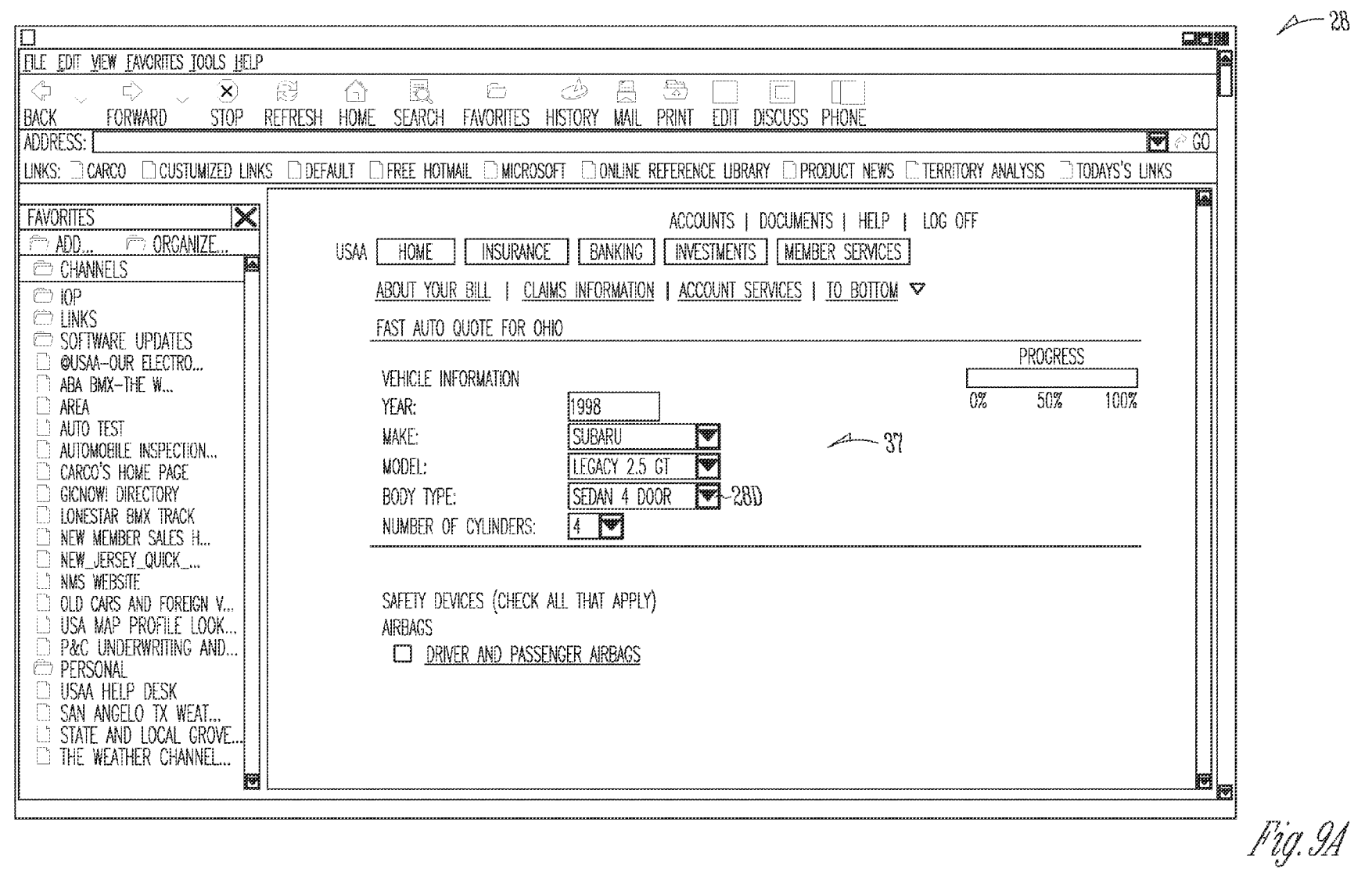
Figure 9B:
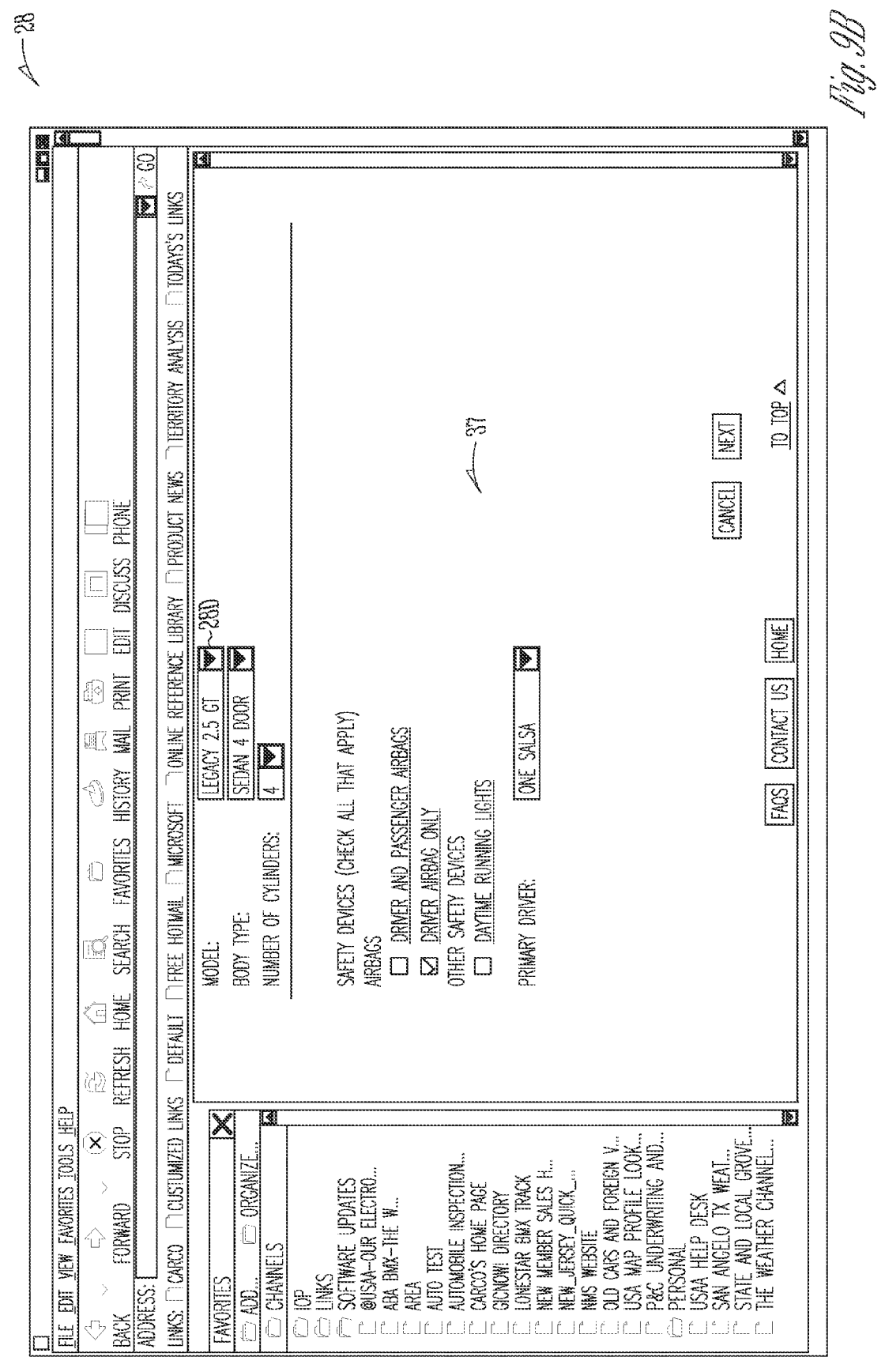

FIGS. 6A-10E are screen shots illustrating the customer graphic user interface of one embodiment of the present invention.

FIGS. 11-16 are screen shots illustrating the customer service representative graphic user interface of one embodiment of the present invention.

DETAILED DESCRIPTION OF THE INVENTION

The present invention is herein described as a method of providing pricing information and as a computer system for providing pricing information.

Figure 1:
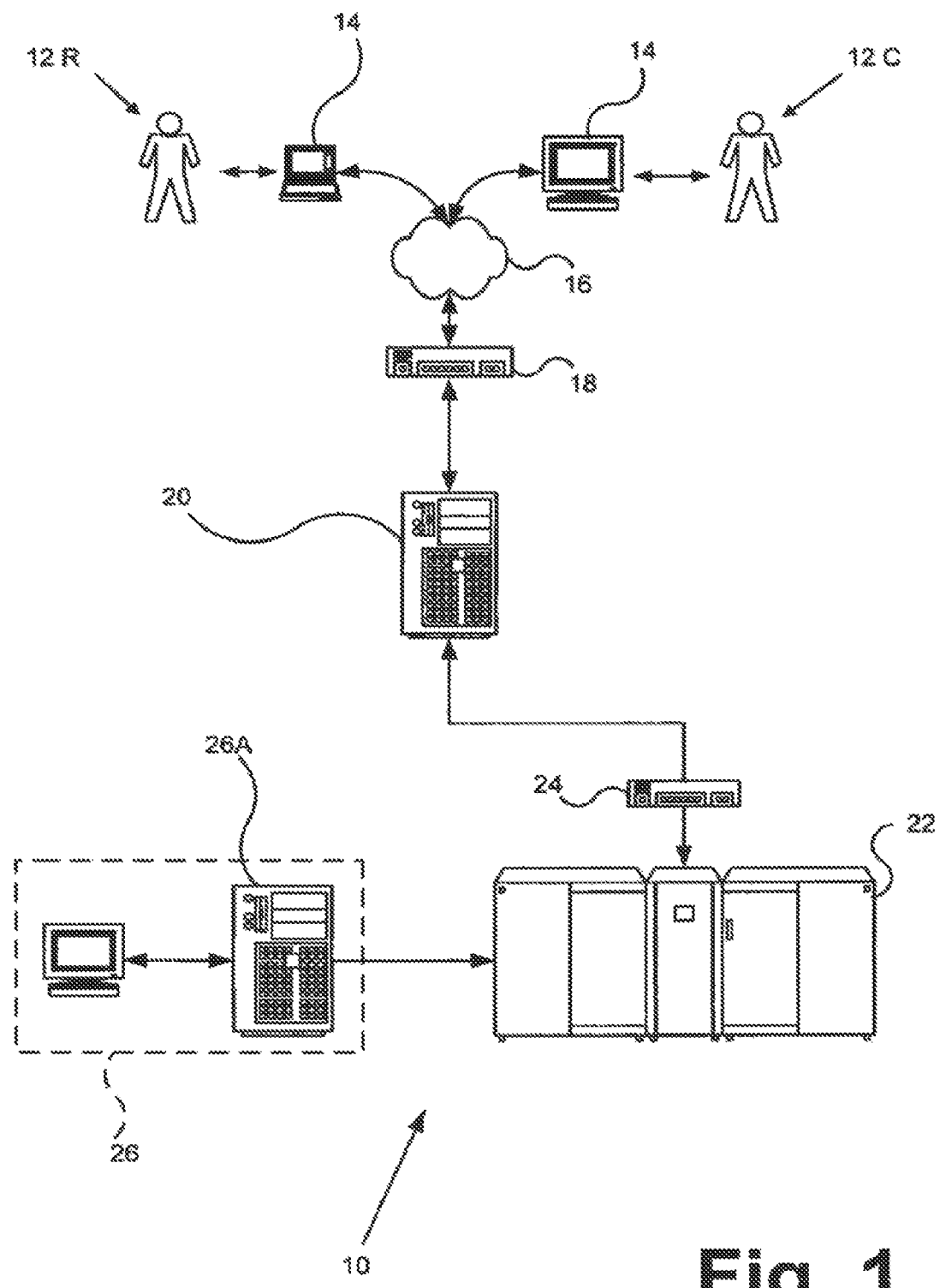
FIG. 1 illustrates a component diagram of one embodiment of the present invention.
Figure 2:
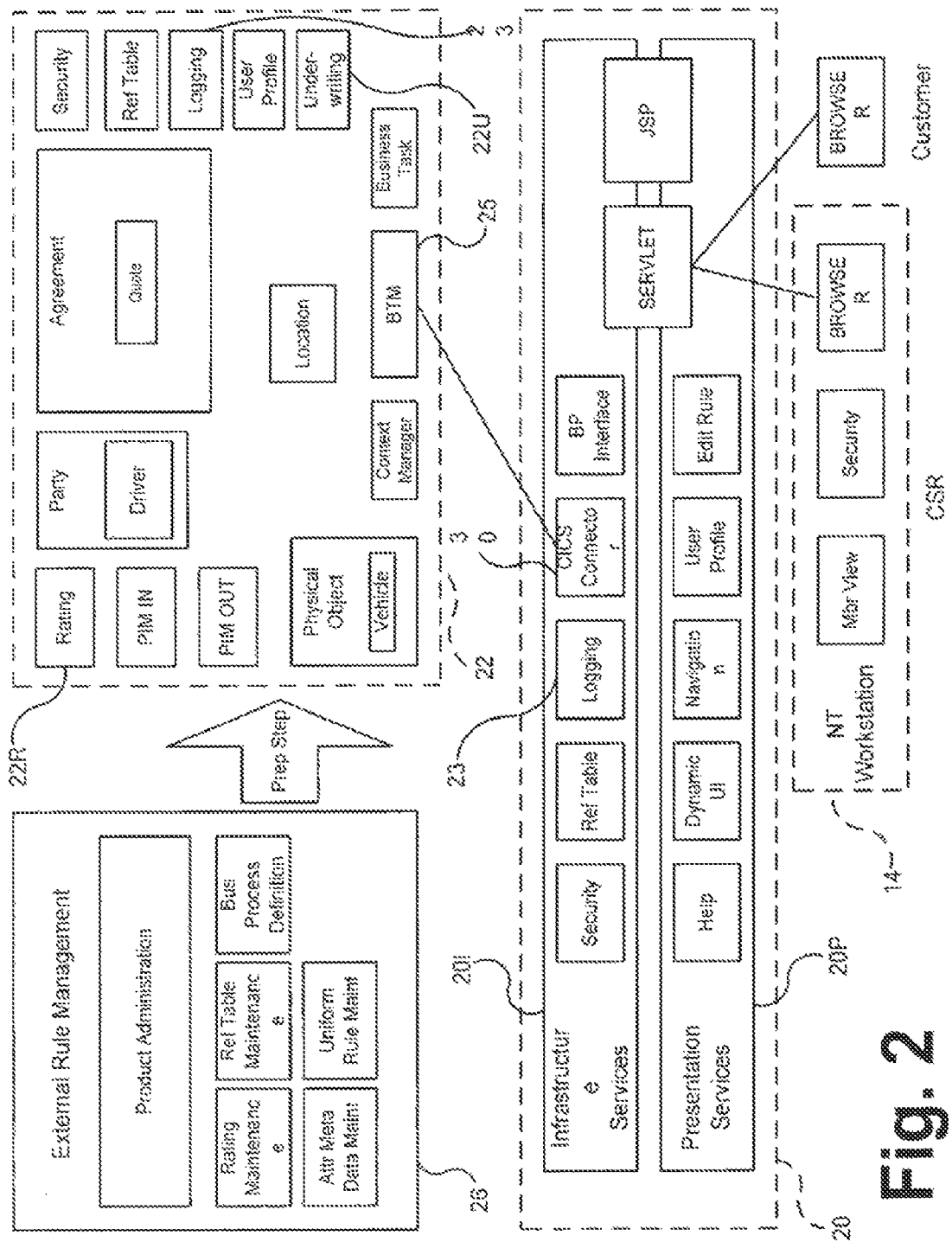
FIG. 2 illustrates the component architecture design of one embodiment of the present invention.

Referring to FIGS. 1 and 2, the present invention comprises a system (10) capable of interaction with one or more customers (12C) for the purpose of transacting e-commerce. In one embodiment, the present invention is ideally suited to provide insurance products. The customer (12C) may utilize a remote computer system (14), such as a personal computer or laptop, to connect with the present invention via a computer network (16).

In one embodiment, the computer system of the present invention comprises an application server (20) designed to interact with one or more remote systems. Specifically, by accessing a URL address through a computer network such as the internet, the customer may be granted access to, and transact business, using the present invention. Security infrastructure is utilized to provide security to the system against unauthorized access and/or harmful viruses. In one embodiment, a firewall (18) positioned between the application server (20) and the computer network (16) is utilized for this purpose.

The application server (20) of the present invention is capable of managing the customer's interaction with the system. In one embodiment, an Advanced IBM Unix/websphere application server is utilized. In another embodiment, web server technology such as a server farm of Intel Pentium 4/MS Windows servers running Microsoft's HS, or a Sun Microsystems E10000/Solaris running IBM's websphere or BEA's web logic servers is utilized by the present invention to facilitate customer interaction.

Referring also to FIG. 2, the application server (20) is equipped with presentation and infrastructure service components (20P and 20I, respectively). The presentation service components (20P) of the application server are designed to manage the graphic user interface (28) of the present invention and assist the user with navigation.

Referring to FIGS. 6A-16, the graphic user interface of the present invention is viewable by either the customer (12C) or the customer service representative (12R). In one embodiment, different JAVA server page (JSP) templates are utilized by the application server (20) to build and display the interface (28) seen by the customer (12C) versus the interface seen by the representative (12R). In another embodiment, the representative interface is designed to be substantially similar, i.e., look and feel, to the interface available to the user.

By providing the customer service representative with an interface substantially similar to the customer's interface, the system allows the customer service representative to better assist the customer through the fast quote process. In one embodiment, the customer interface provides navigation links at the top of the browser pages. It being understood that both interfaces provide data entry and selective fields (28D) for use by all users.

The present invention provides customer service representatives with customer information, if applicable, at the top of the screen, along with intelligent online procedures (IOP) and help links on the side of the interface. Thus, although the look and feel of the customer and customer service representative screens are similar, the customer service representative is provided with additional information useful in assisting the customer. In one embodiment, this information may include city/county information (84), consumer report information (86), incentive information (88), supplementary vehicle information including make, model, airbags, and daytime running lamps (90), risk profile information (92), coverage information (94), and methods of payment (98). Selected screen shots of the customer interface are illustrated in FIGS. 6A-10E while selected screen shots of the representative interface are illustrated in FIGS. 11-16.

Referring back to FIGS. 1 and 2, in one embodiment, metadata is utilized by the application server (20) to render display enhancements, such as labels, which may be different for the customer and service representative screens. Further, the application server may be equipped with a storage device (23) for storing and maintaining electronic information useful for the presentation upon the graphic user interface. In one embodiment, the application server storage device may be utilized to store driver and vehicle information provided by the customer.

The infrastructure service components (20I) of the application server provide various security features as well as a CICS connector (30) capable of sending and receiving requests to the mainframe system (22), as described further below. In one embodiment, the infrastructure service component (20I) of the application server (20) contains at least one storage device.

In one embodiment, the present invention provides a mainframe system (22) having at least one storage device (23) for storing electronic data. The mainframe system is coupled to the application server (20) such that information may pass therebetween. Both the application server and the mainframe system may be equipped with multiple storage devices. For example, each component shown in FIG. 2 may be equipped with its own corresponding memory unit. In one embodiment, the mainframe system is equipped with a rating engine (22R) and an underwriting engine (22U).

The underwriting engine of the present invention allows the system to provide an insurance quote to a customer regardless of the risk to insure. Specifically, the underwriting engine has been incorporated into the mainframe system (22) of the present invention such that it may be directly accessed by the system in response to a customer quote request. Thus, the system provides an automated risk assessment through the underwriting engine as if the customer were physically present with a customer service representative. In short, the underwriting engine determines which risk code should be assigned to the customer given their state of residence, and other information unique to the customer at time of quote.

The use of unique assumptions by the present invention allows the underwriting engine (22U) to assess the risk associated with insuring the customer as quickly as possible. Specifically, the underwriting engine utilizes the assumptions in conjunction with the driver and vehicle information (35 and 37, respectively) provided by the customer. In this way, the system dramatically reduces the number of questions that the customer must respond to in order to be given an accurate quote.

Once the risk has been assessed, the risk code provided by the underwriting engine is utilized by the rating engine (22R) to calculate an insurance quote for the customer. In one embodiment, the mainframe system (22) of the present invention utilizes Ratabase® software to calculate the estimated price. This quote is then presented to the user via the graphic user interface (28) provided by the application server.

In addition to the above, the mainframe system is also equipped with various business components, storage device (s), task management components, and infrastructure components as illustrated by FIG. 2. In one embodiment, the task manager (25) provided by the mainframe system (22) is equipped with software capable of receiving and interpreting signals provided by the application server. In short, the task manager is designed to process information from the server and direct the tasks that contact and activate specific business services held upon the mainframe storage device(s). This allows the graphic user interface of the present invention to retrieve and display any information held upon the mainframe system upon request.

It should be understood that the present invention may utilize any number of hardware components and that the present invention is not limited to those explicitly described herein. For the purposes of illustration only, the mainframe system utilized by the present invention may be an IBM S/390 mainframe system. In one embodiment, the application server (20) is coupled to the mainframe system (22) via a CICS connector (30). It being understood that the mainframe system (22) may be equipped with security infrastructure such as an external vendor firewall (24) to provide additional security against unauthorized access.

In one embodiment, the present invention provides an external rules management system (26) operable in conjunction with the mainframe system (22). Specifically, the external rules management system is designed to update and maintain information held upon the mainframe system. In one embodiment, the rules management system is an offline computer system (26A) capable of receiving new information or changes that may then be passed to the mainframe system at regular intervals.

This feature of the present invention allows the mainframe system to be continually updated without interruption of the online customer process. Such maintenance and/or updates may take the form of new or amended products, changes to applicable federal or state regulations, amendments to metadata information applicable to the graphic user interface, etc.

The external rules management system allows changes to be made to both the customer interface and the customer representative interface simultaneously. Amendments and/or changes may be tested to ensure compatibility prior to submission to the mainframe system (22) such that no interruption in online function is required.

Figure 3:
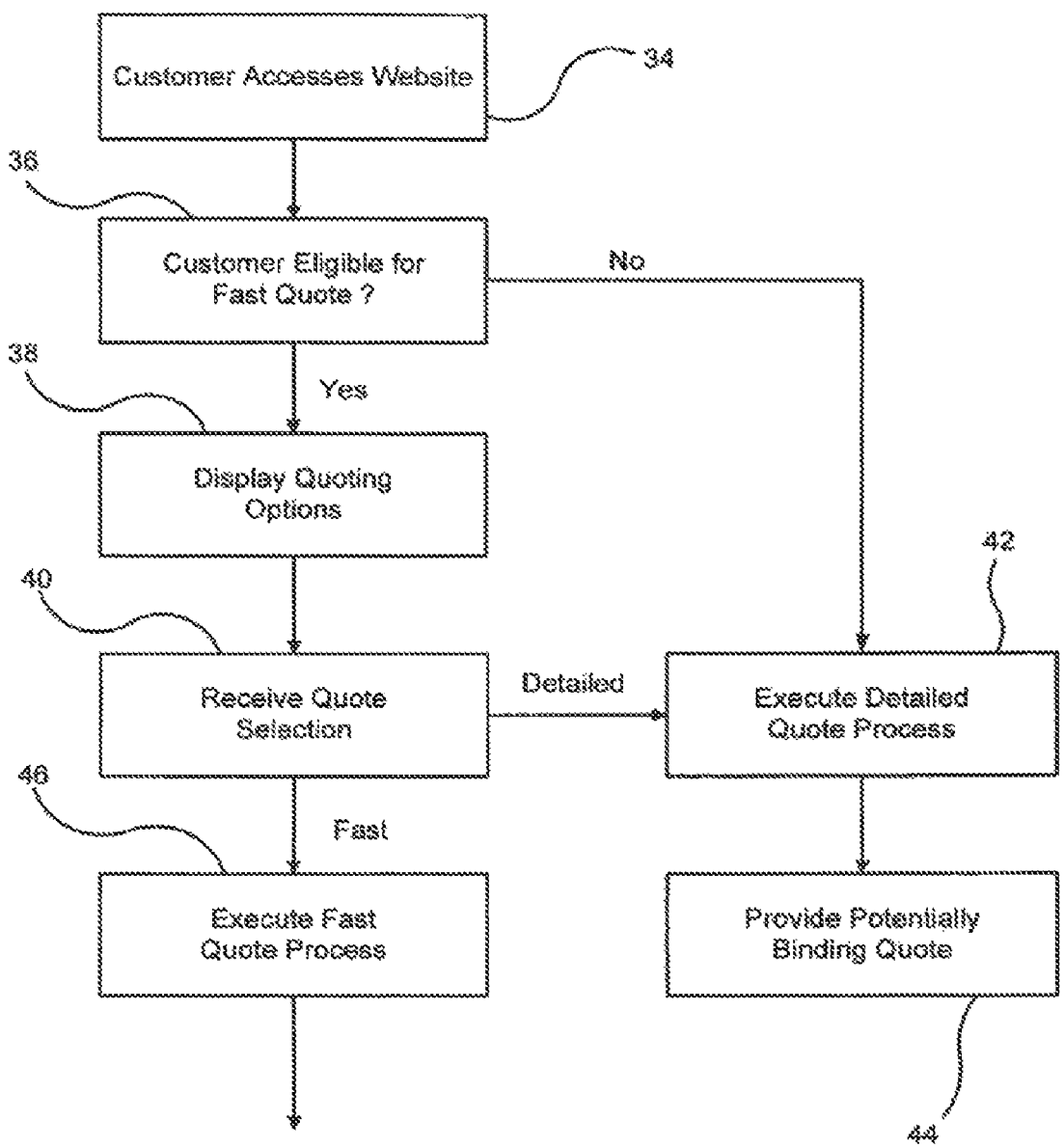
FIGS. 3-5 are process flow diagrams illustrating the fast quote process of one embodiment of the present invention.
Figure 4:
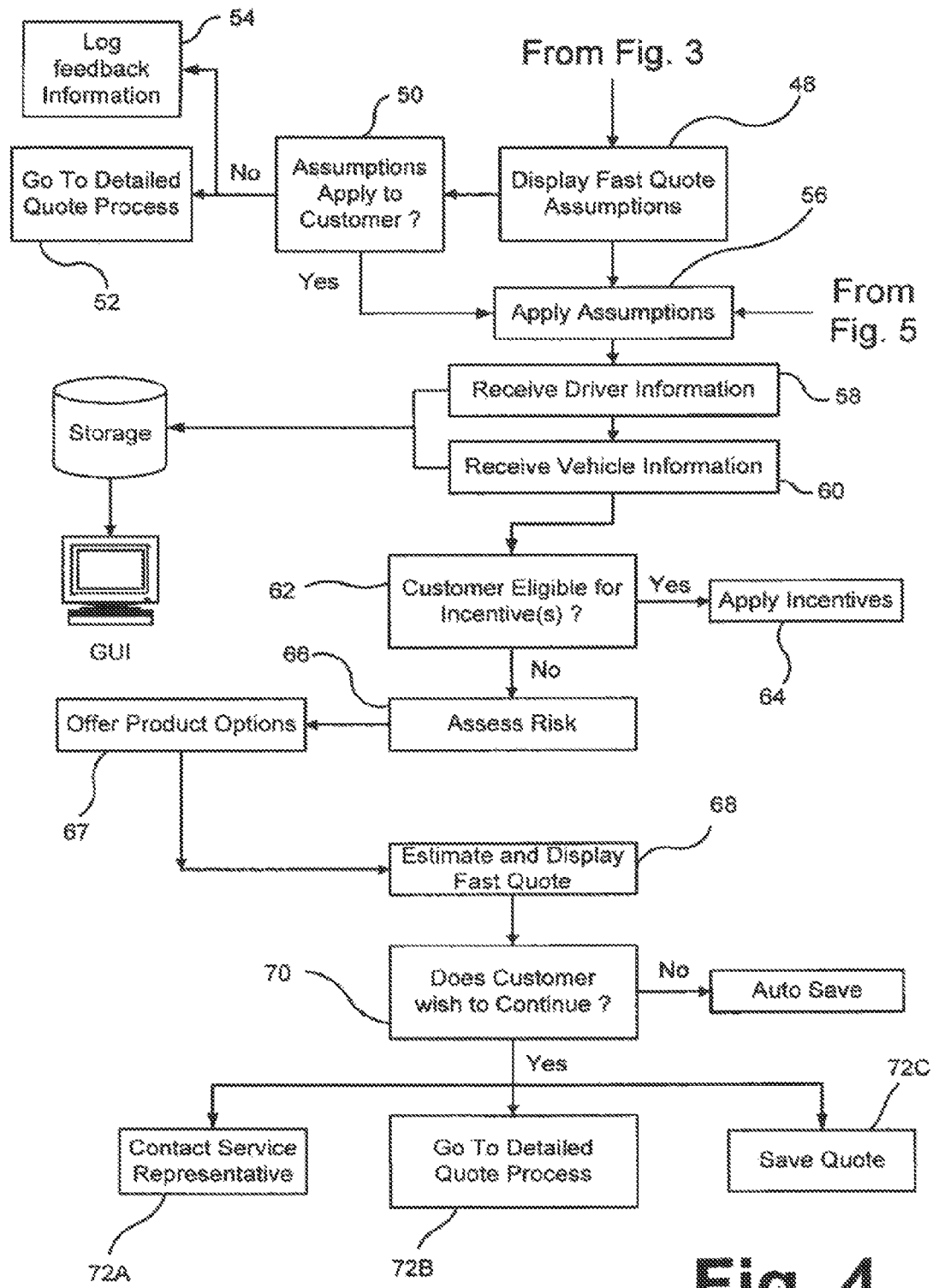
Figure 5:
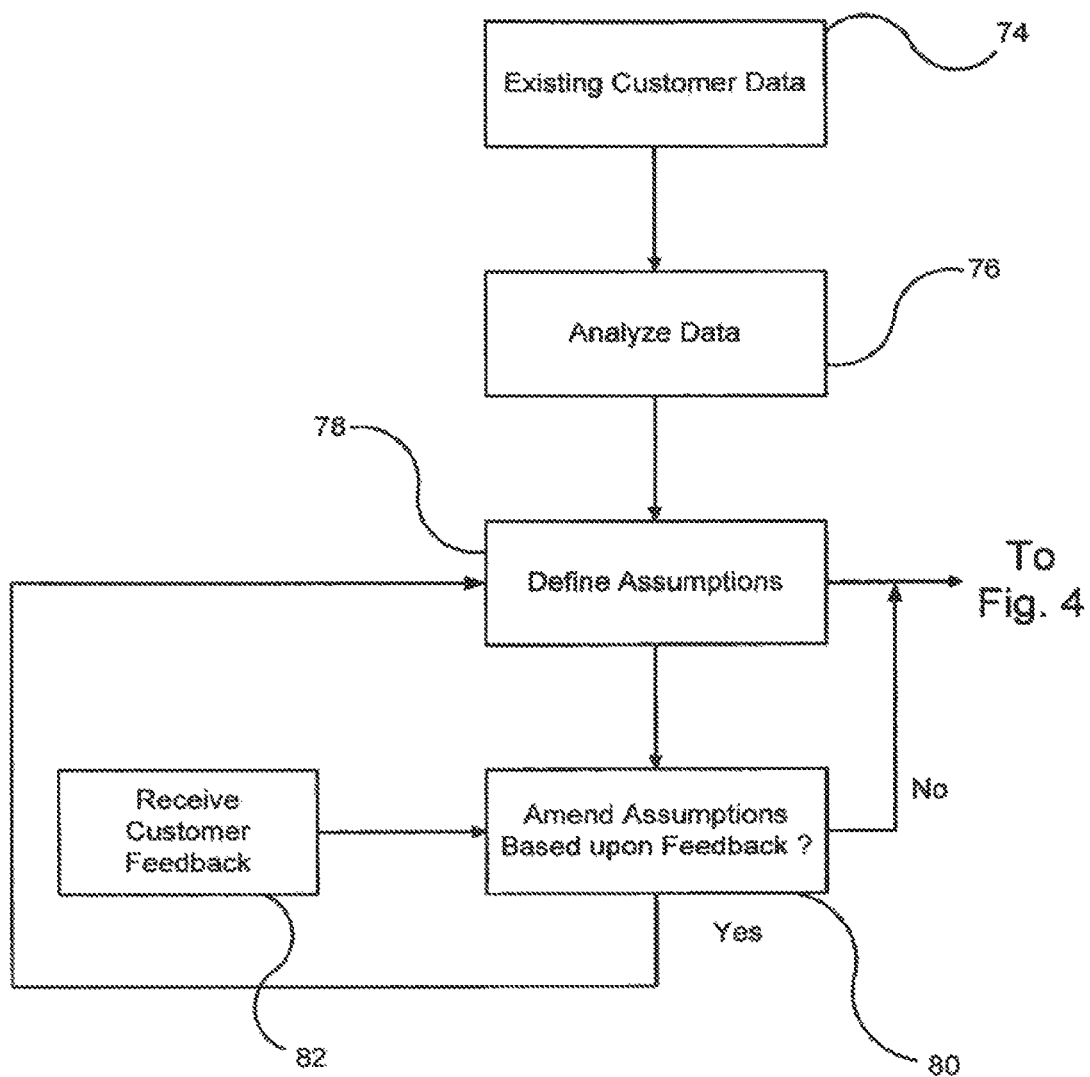
Figure 7A:
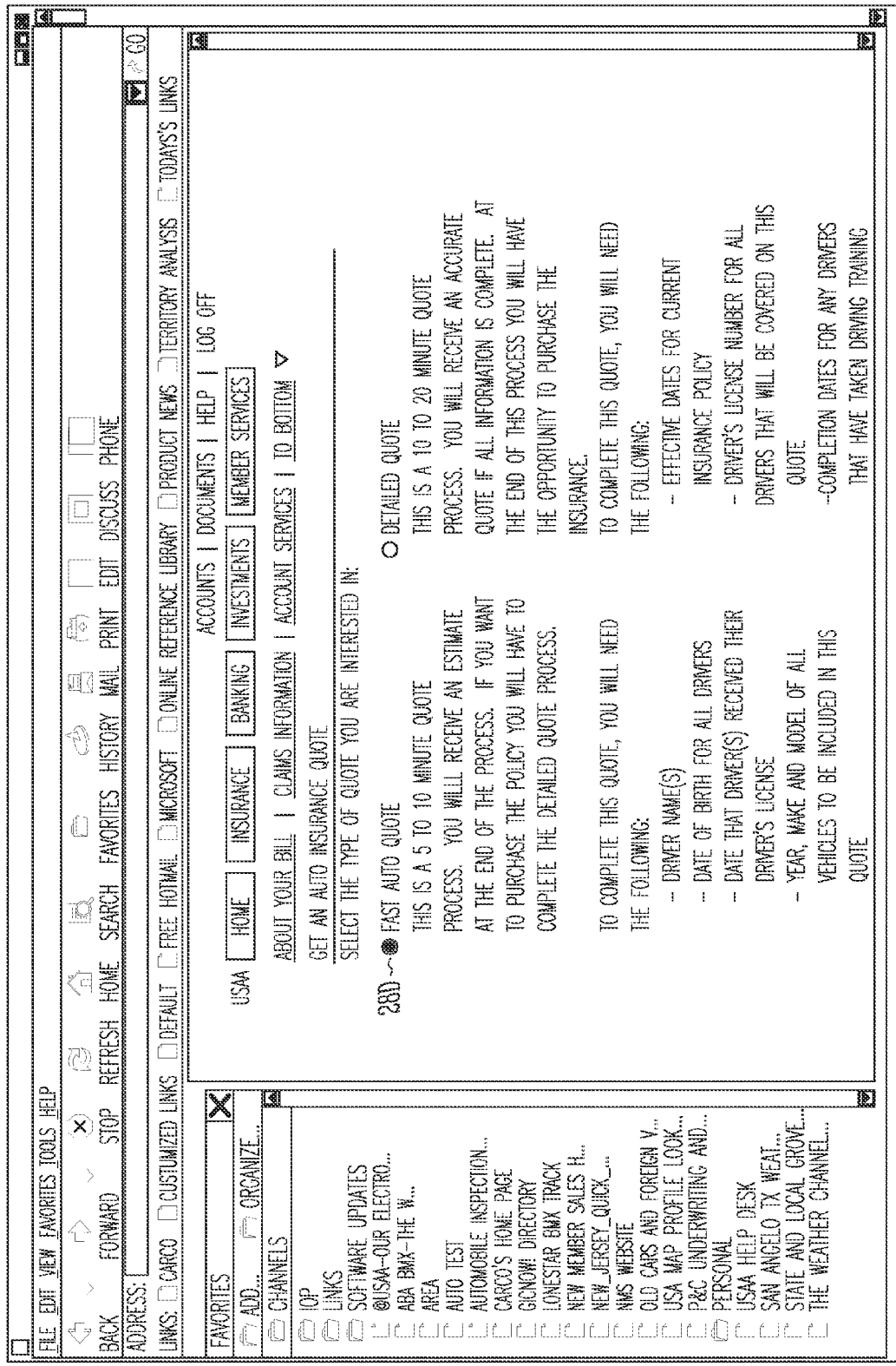
Figure 7B:
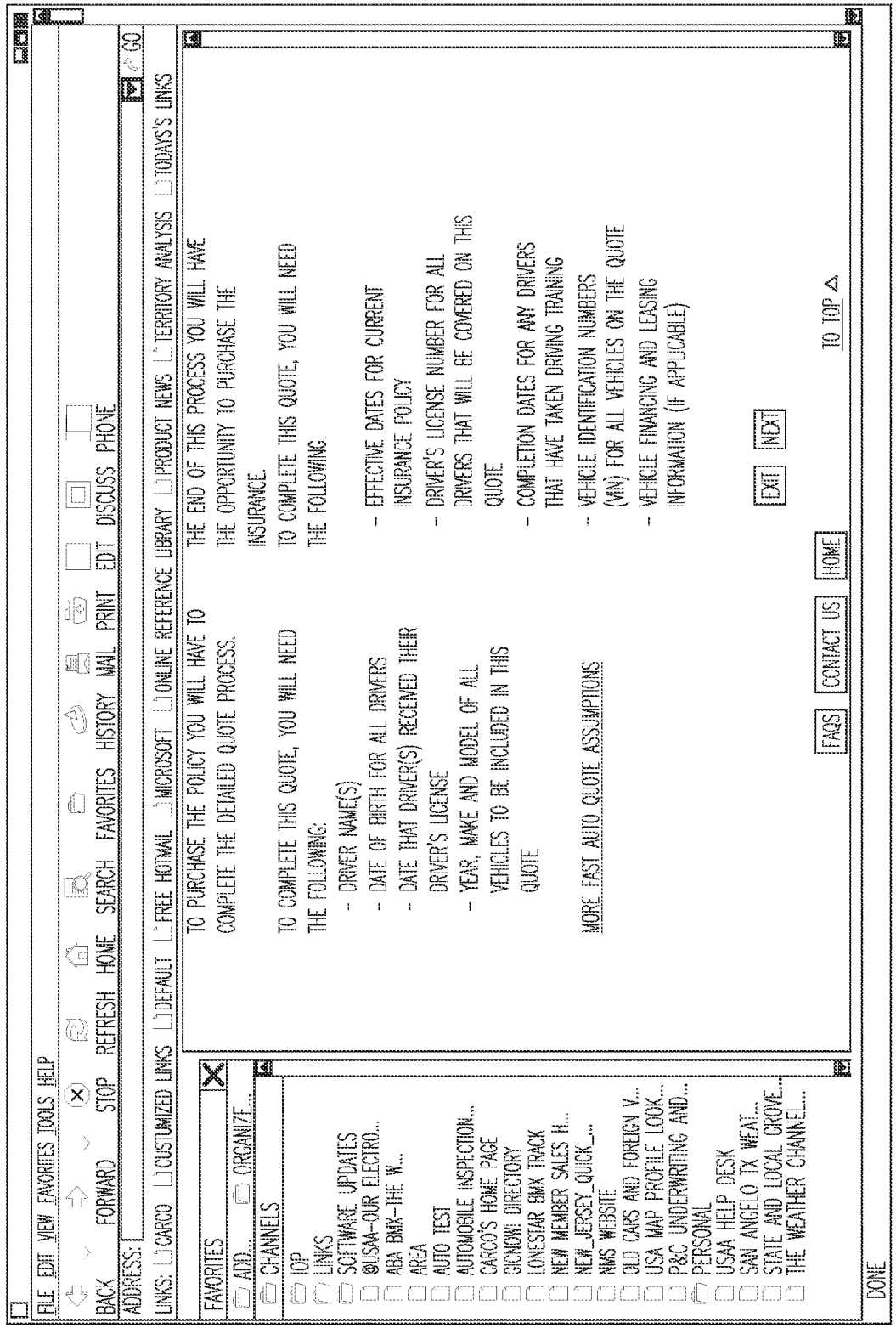
Figure 8C:
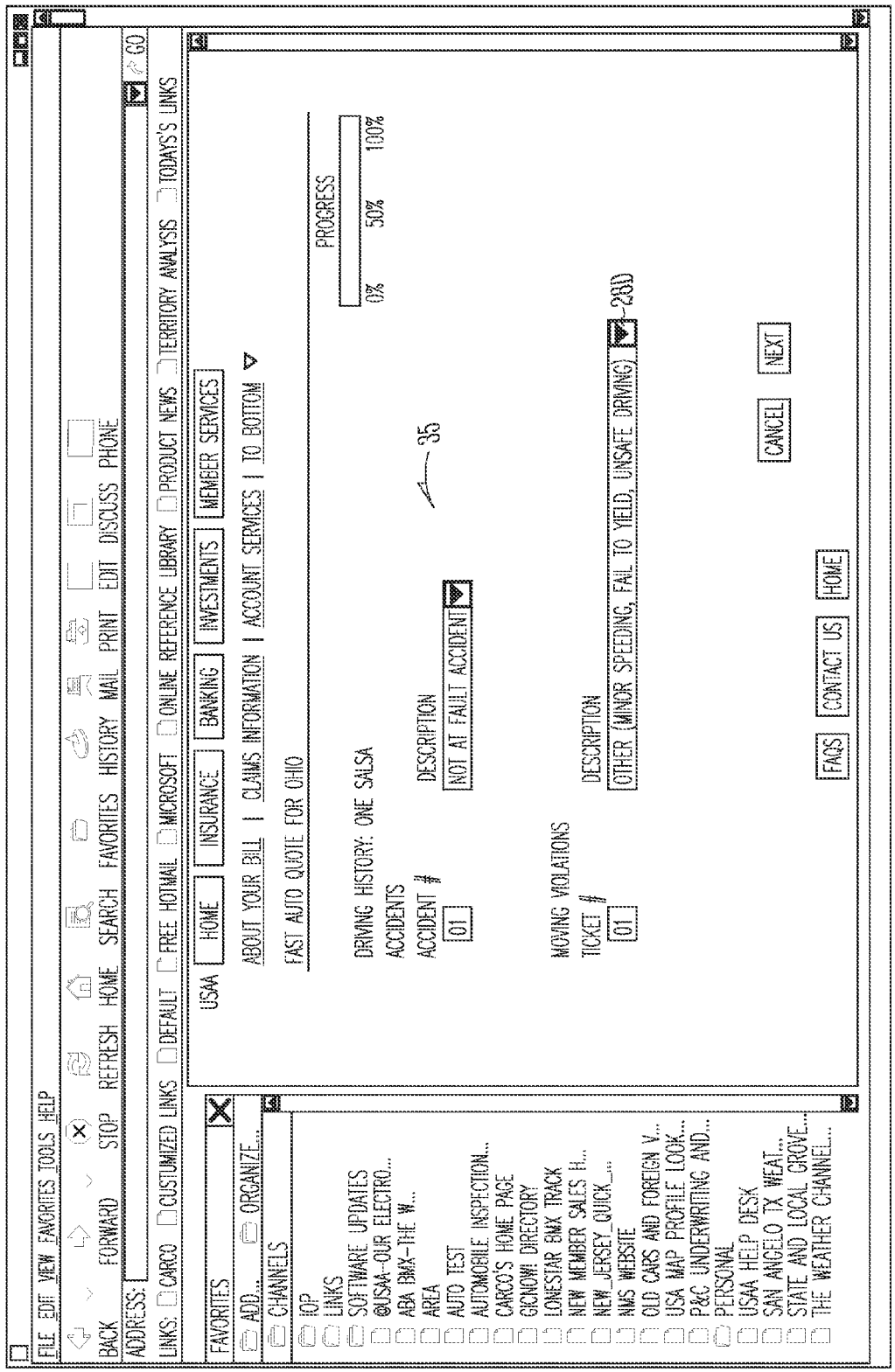
Figure 9C:
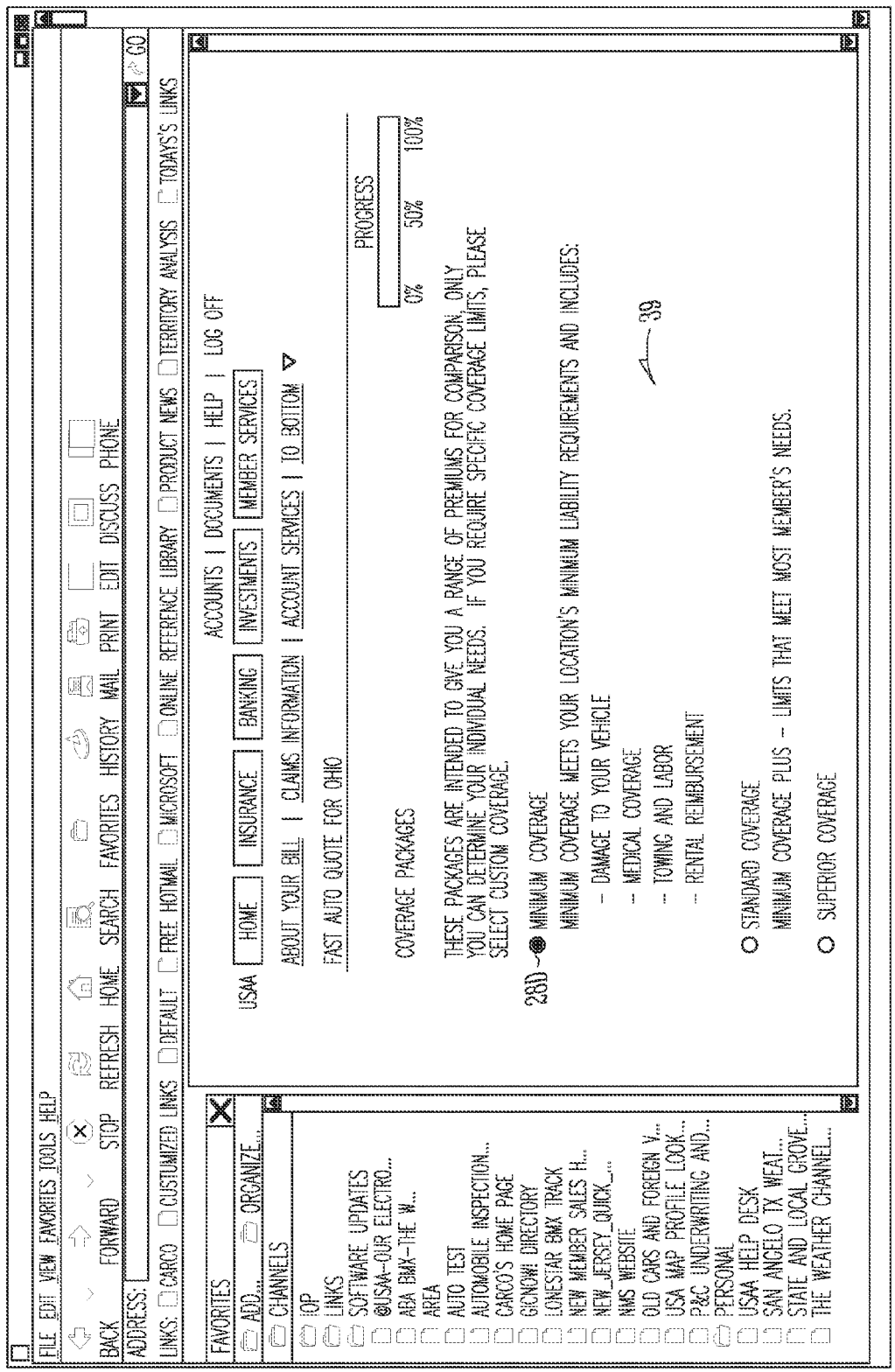
Figure 9D:
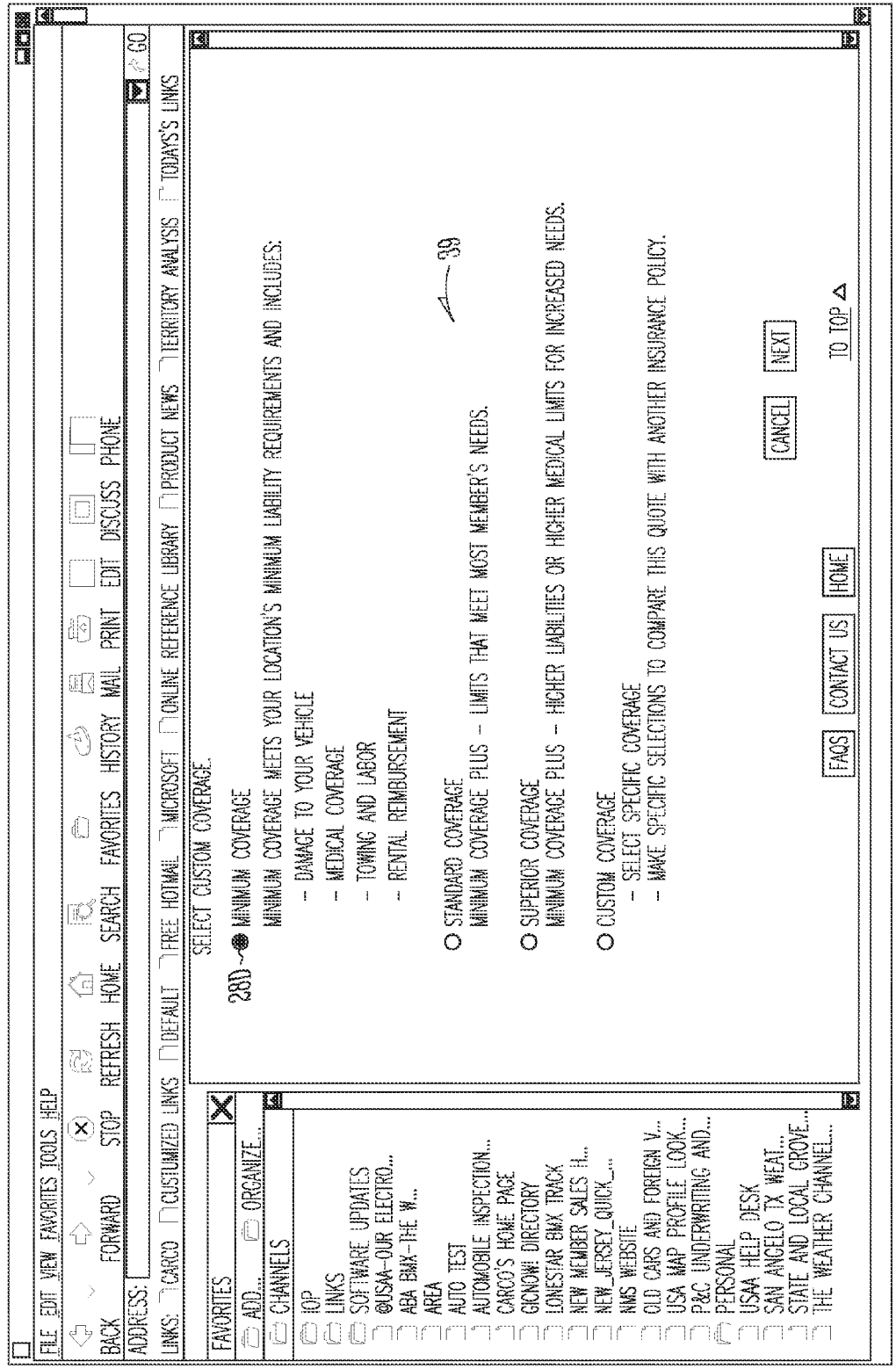
Figure 9E:
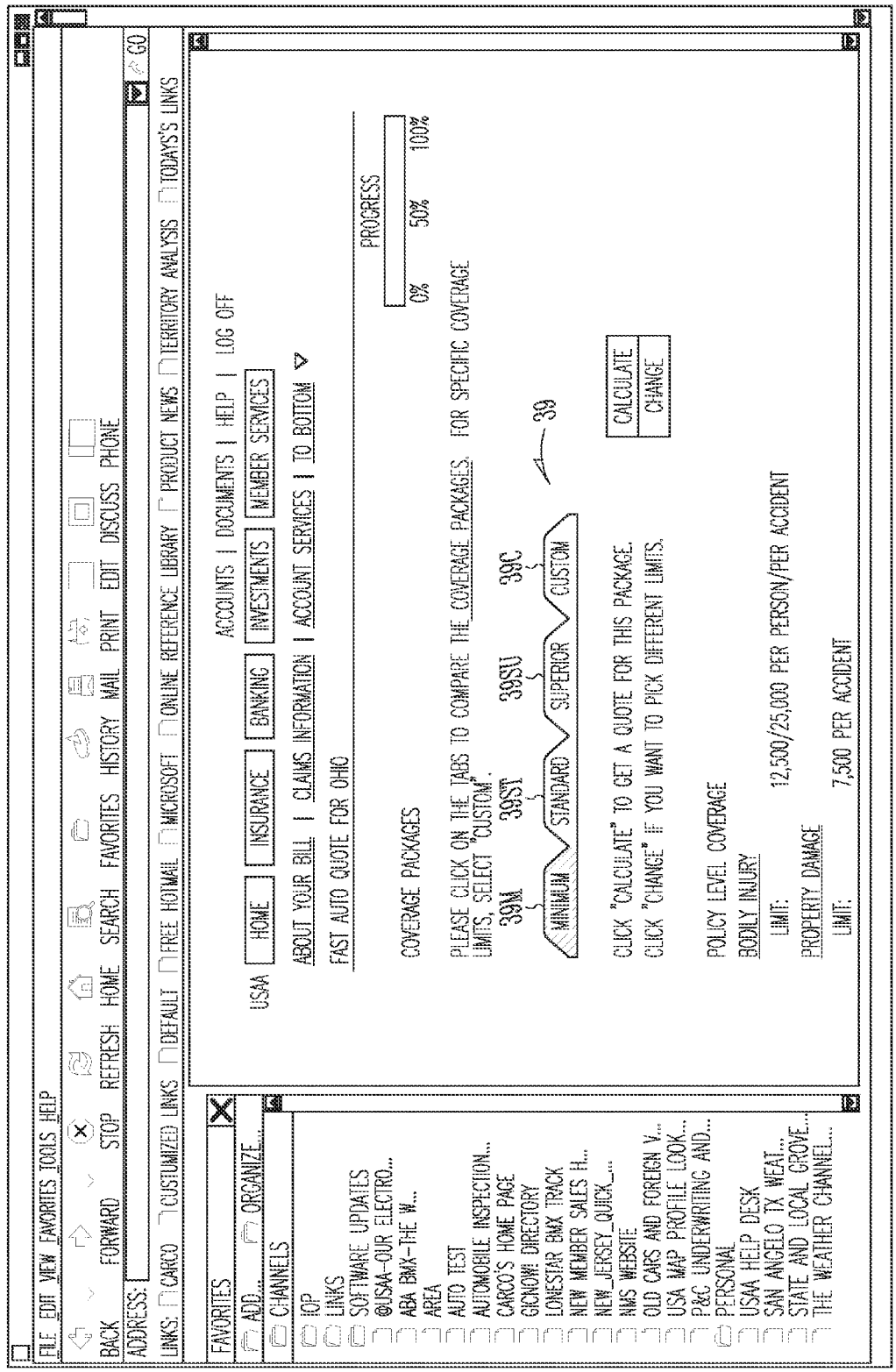
Figure 9C:
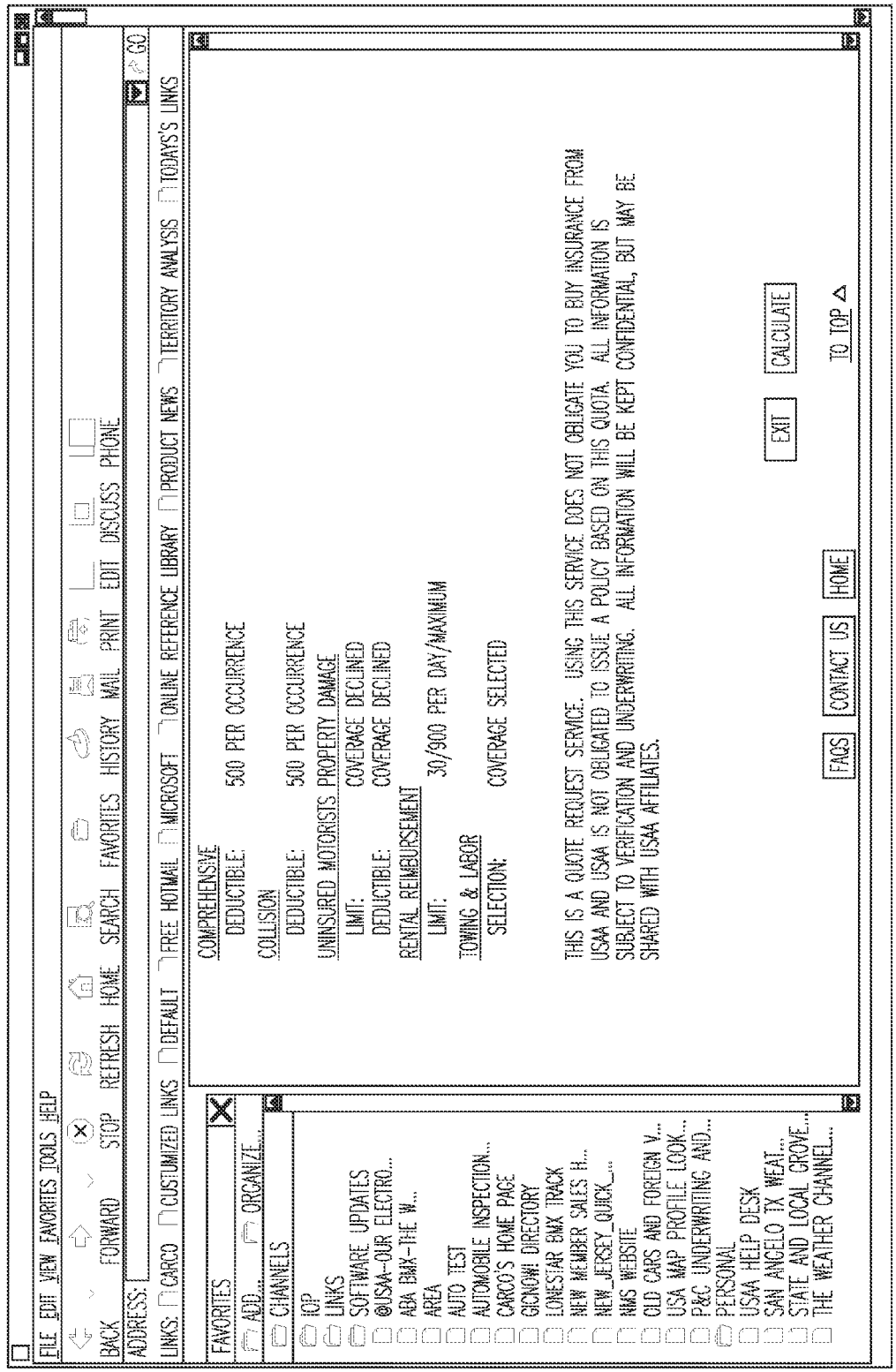
Figure 10B:
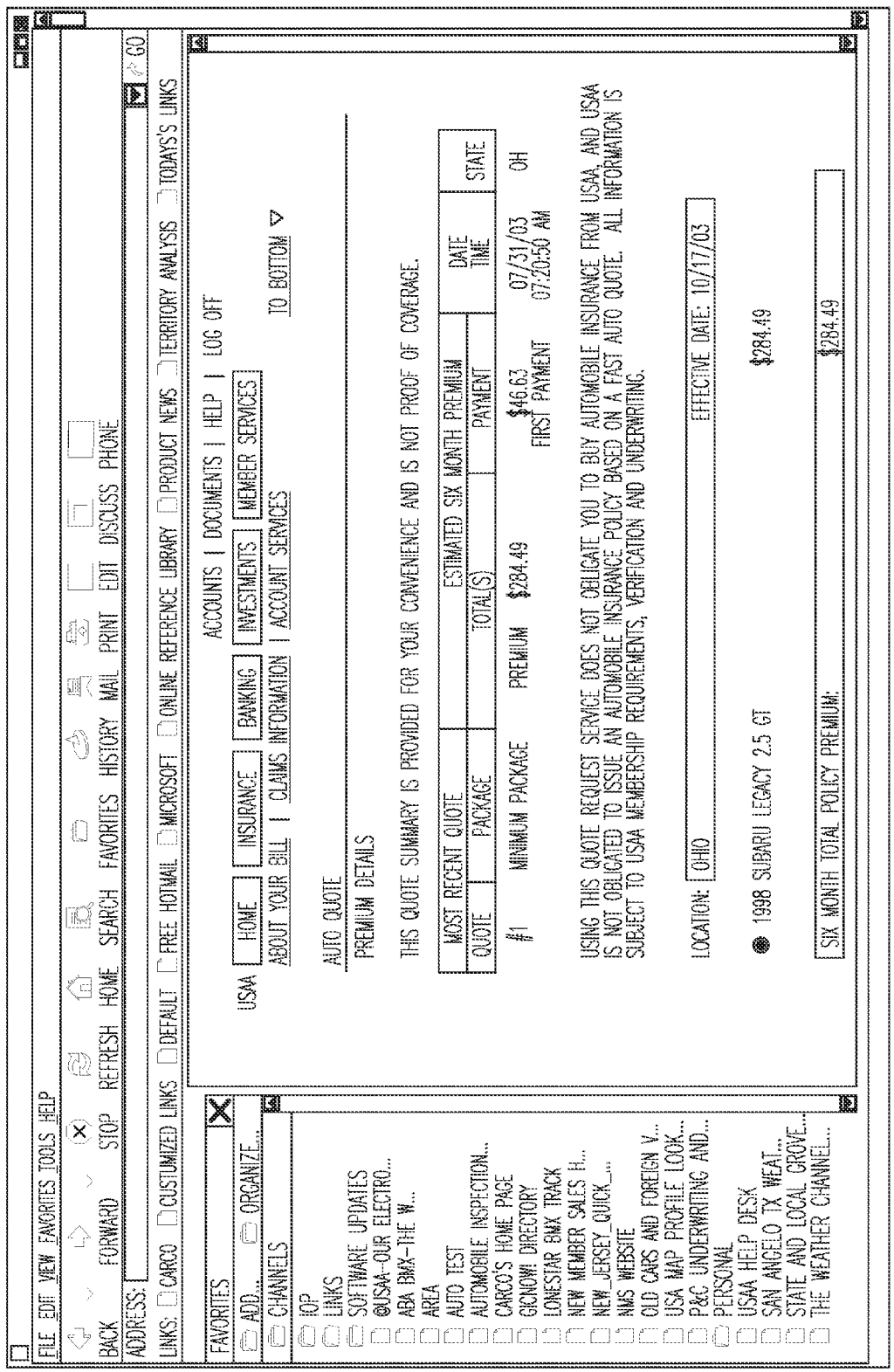
Figure 10C:
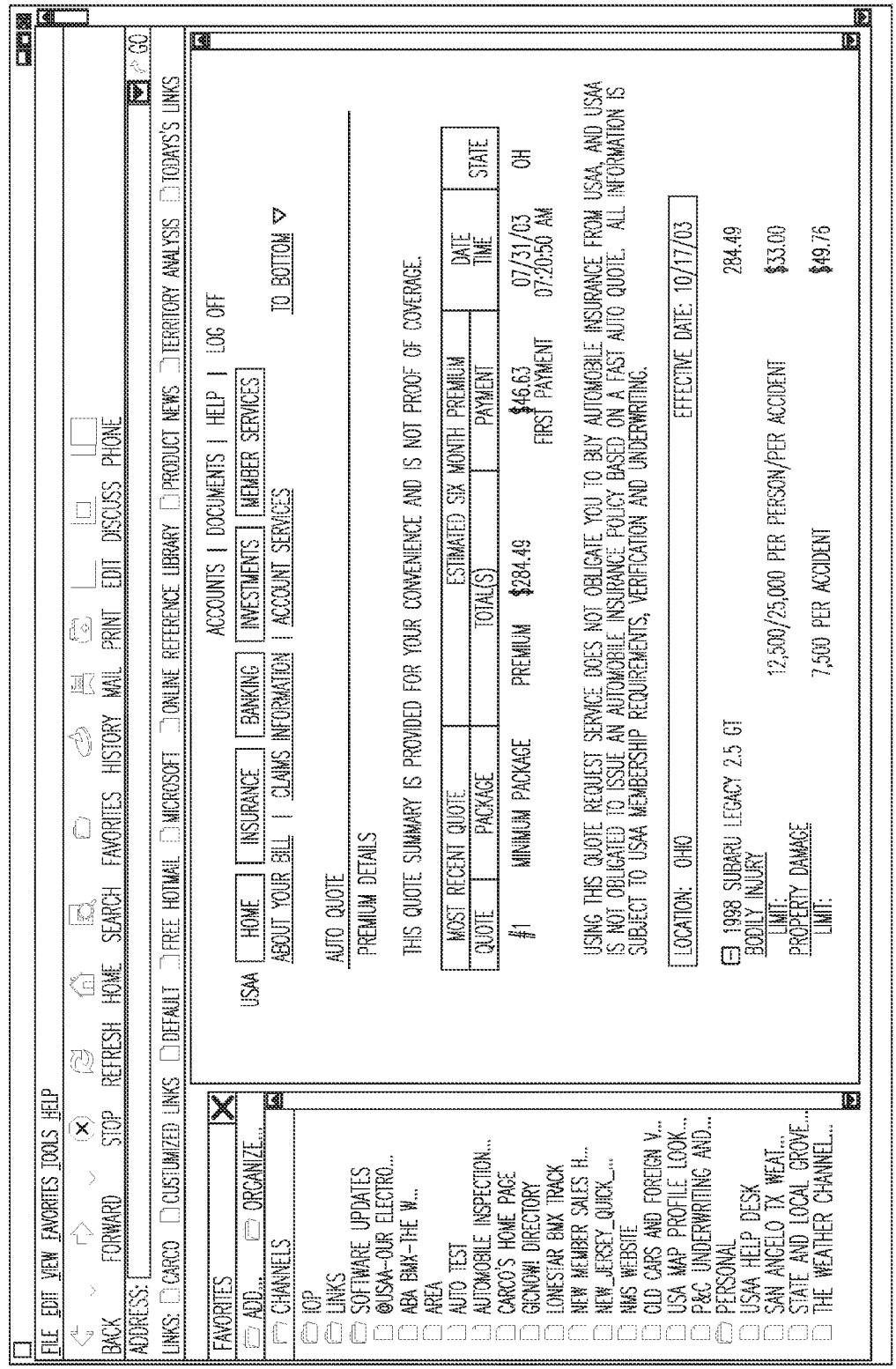
Figure 10D:
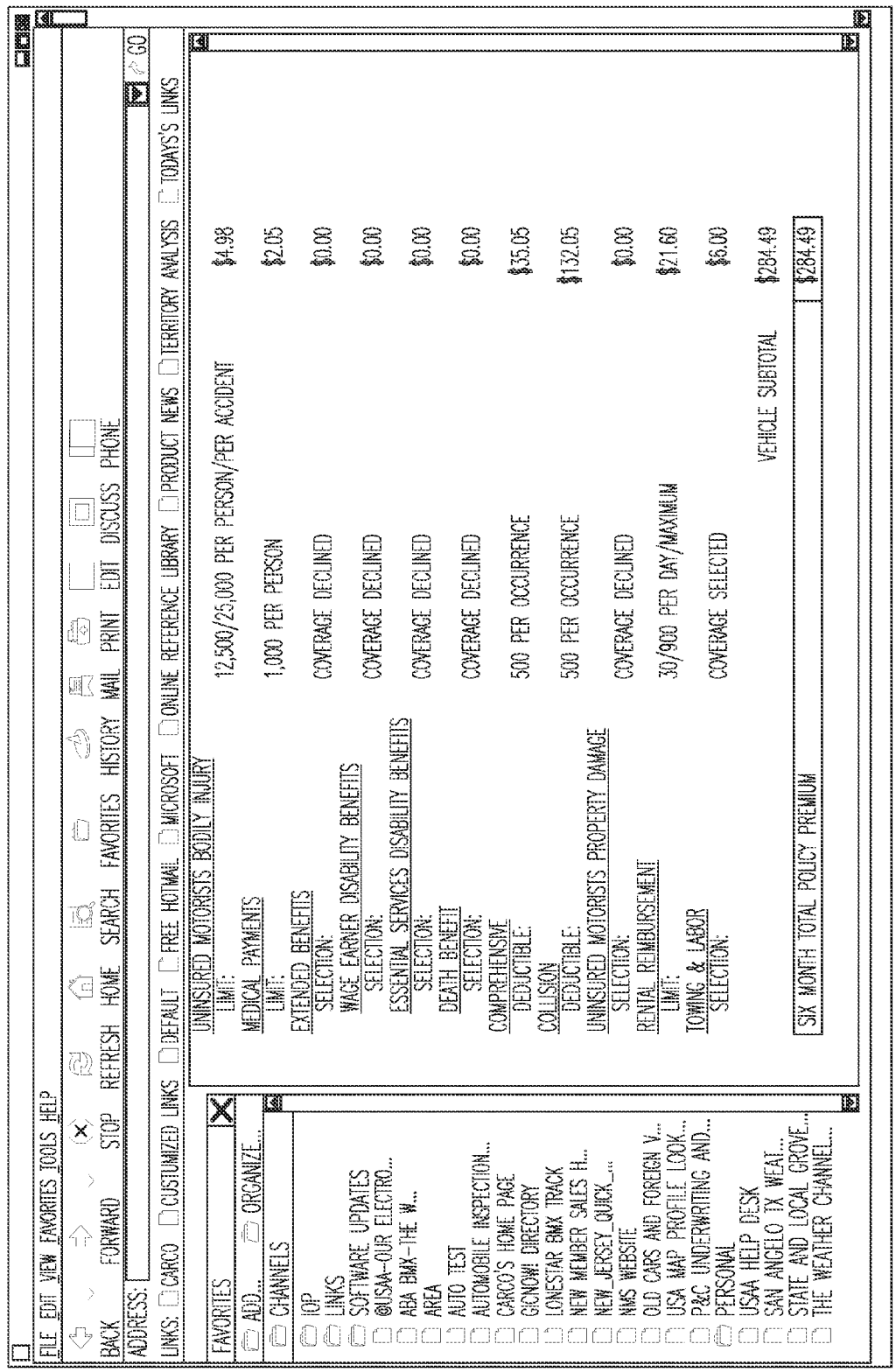
Figure 13:
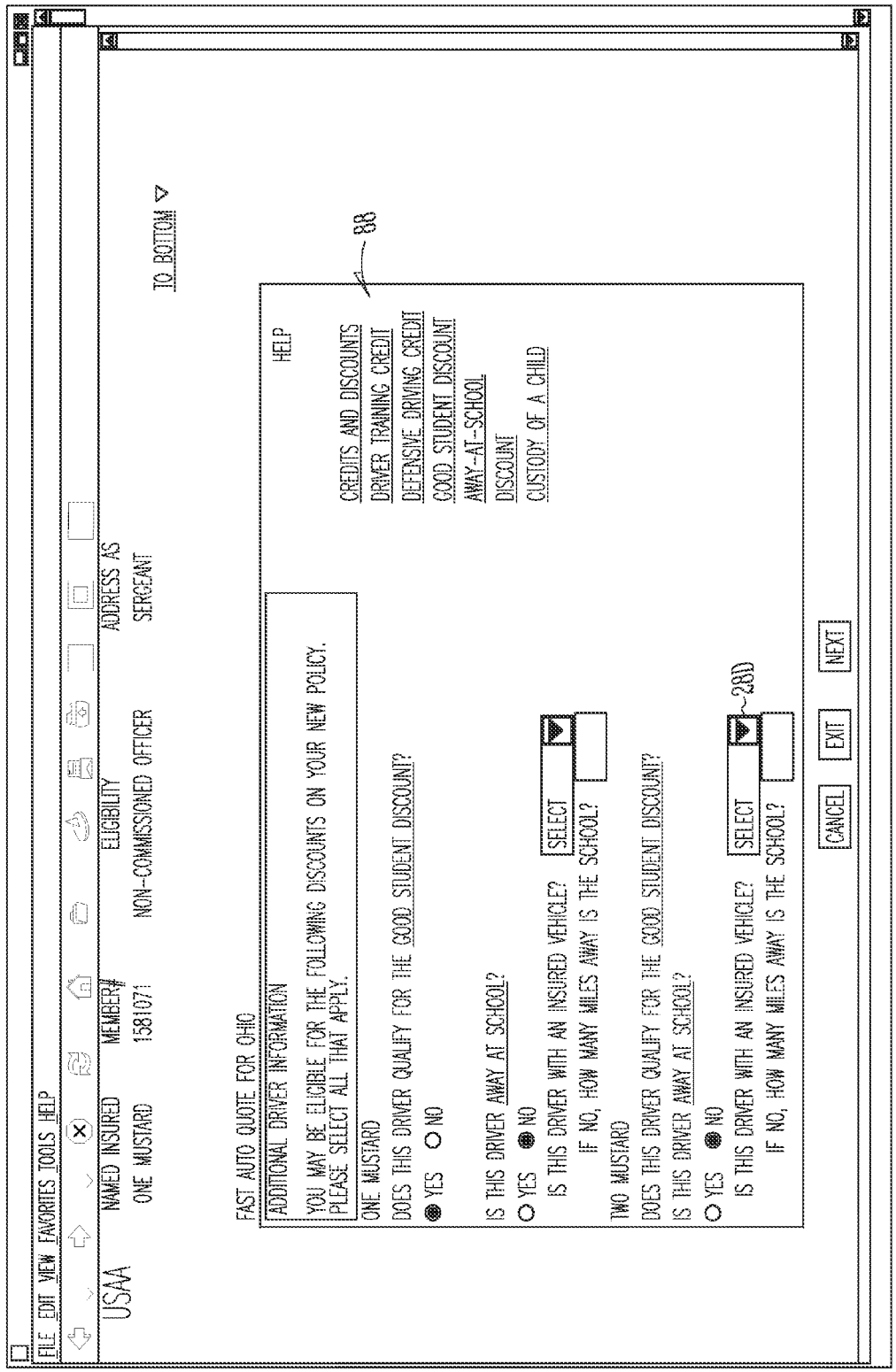

Referring to FIGS. 3 through 5, in one embodiment, the customer (12C) may utilize the remote computer system (14) to connect with the present invention through the computer network (16), as illustrated by Box 34. At this time, the customer is presented with a limited number of questions designed to determine whether the customer is eligible for the fast quote process, as illustrated by Box 36. For example, a few states do not allow insurance companies to provide non-binding estimates to the customer. Thus, it is necessary to determine the state of residence for the customer at issue. If the customer is determined to be unacceptable for the fast quote process, the present invention automatically provides a detailed quote process for the customer's use, as described further below.

If the customer is acceptable for the fast quote process, the present invention will provide an overview of the customer's choices, as illustrated by Box 38. Specifically, the customer is provided with explanation of both the detailed quote process and the fast quote process and is requested to enter a preference with regard to which process will be executed. Referring to Boxes 40, 42, 44 and 46, once received, the customer's preference is noted and the preferred quoting process is begun for the customer's benefit.

Referring to FIGS. 4 and 6A-16, upon selection of the fast quote process option, the present invention displays a listing of assumptions to be made by the system, as illustrated by Box 48. In one embodiment, the present invention requests that the customer confirm that each assumption being made is applicable, as illustrated by Box 50. In one embodiment, the assumptions made by the present invention include good credit, active driver's license, no vehicle value over $80,000.00, vehicular usage limited to 12,000 miles for work/school, and/or all vehicles built according to applicable federal and state laws of the United States.

If the customer confirms the assumptions, they are applied by the system, as illustrated by Box 56. However, if the customer does not confirm that the assumptions are correct, the system cancels the fast quote process and, instead, provides the first graphic user interface screen for the detailed quote process, as illustrated by Box 52. In one embodiment, "feedback information" relating to the assumptions is logged for future reference, as illustrated by Box 54.

In addition to application of the assumptions, the customer is queried for driver information (35) including, but not limited to, the number of drivers to be insured, previous insurance coverage, driver identification, and/or driver history, as illustrated by Box 58. Further, the system queries the customer to provide vehicle information (37) including, but not limited to, vehicle location, the number of vehicles being insured, make and model of each vehicle, and/or vehicle safety devices present, as illustrated by Box 60. Driver and vehicle information may then be stored for later review/use.

In one embodiment, the present invention utilizes one or more remote information sources to obtain all or a part of the customer's vehicle and/or driver information. Such information sources may include, but are not limited to, data services such as the customer's Motor Vehicle Report (MVR) and the Comprehensive Loss Underwriting Exchange (CLUE). This feature of the present invention further reduces the amount of information that the customer must provide in order to receive a price quote. In one embodiment, such information may be retrieved electronically via a computer network.

The present invention is also capable of providing the customer with various product packages (39), as illustrated by Box 67 of FIG. 4. In one embodiment, such packages may include a minimum package covering the minimum liability requirements of the customer's home state, a standard package providing insurance limits that satisfy a majority of customers, a superior or maximum package providing the customer with increased and/or maximum available liabilities and/or medical limits, or a custom package wherein the customer may enter specific values he or she wishes to obtain. In one embodiment, the present invention provides various coverage options using attractive tabs positioned upon the graphic user interface.

In one embodiment, the customization capability of the present invention allows the user to copy product features associated with an existing product package and then enter customized values. For example, if Customer "A" wishes to receive a quote for the minimum package but wants to increase the amount of bodily injury coverage, he or she may simply select the change button on the minimum package display screen to do so. This feature of the present invention allows the customer to obtain a price quote for a preferred product package without entering each and every coverage amount.

In one embodiment, the present invention utilizes the driver information and/or vehicle information to determine if an incentive, including discounts, promotions, or any other benefit to the consumer, is applicable, as illustrated by Box 62. Such an incentive may be applied to the quoting process by the present invention, as illustrated by Box 64. In one embodiment, the present invention maintains and stores a table of incentive Hiles defining which type of customer may be offered an incentive. In one embodiment, the incentive rules table is arranged so as to cross reference each available incentive with driver and/or vehicle information provided by the customer so that such incentives may be offered to the customer.

Once the assumptions have been applied, driver and vehicle information are analyzed to 1) assess the risk associated with insuring the customer at issue, and 2) calculate an estimated price to insure the customer given the information provided, as illustrated by Box 66. The resulting quote, may then be displayed upon the graphic user interface (28), as illustrated by Box 68.

At this time, the customer is given several options as to how he or she would like to proceed, as illustrated by Boxes 70, 72A, 72B, and 72C. In one embodiment, the customer may wish to proceed to the detailed quote process in order to receive a potentially binding quote and ultimately purchase the insurance product. The detailed quote process is also conducted online but takes additional time for the customer to complete, given that the assumptions are not utilized. However, the system may save the data entries made during the fast quote process for subsequent use during the detailed quote process. Once the fast quote process is completed, the customer may choose to save the fast quote information for later use, or may request servicing by a customer service representative either via email or a telephone call.

Referring to FIG. 5, the assumptions utilized by the present invention may be derived from analysis of existing customer data, as illustrated by Boxes 74 and 76. Specifically, in one embodiment, the characteristics of existing customers are analyzed to determine what assumptions apply to the greatest number of customers. In using such data, the present invention allows the assumptions to apply to the greatest number of potential customers likely to access the organization's website. Further, the assumptions may be refined in light of feedback information provided by potential customers over the computer network, as illustrated by Boxes 78, 80, and 82. For example, if a potential customer indicates that one or more of the previously defined assumptions do not apply, this information is logged upon one or more storage devices and examined to determine if amendment of the assumptions is warranted. If a large number of potential customers are not able to utilize the fast quote process due to one or more assumptions, they may be amended to enable the system to service a greater number of customers. In one embodiment, such changes would be made via the external rules management system (26).

The present invention allows assumptions to be removed or amended depending on the customer at issue. Furthermore, different sets of assumptions may be created for different types of customers. For example, if the customer does not satisfy the "good credit" assumption or is of a certain age or maintains a certain military rank, he or she may be provided with a dynamically rendered screen designed to address customers, or sets of customers, who do not exactly match the predetermined assumptions. In operation, the dynamically rendered screen of the above example would simply provide the customer with a question regarding his or her credit to allow the correct information to be entered. The system would then utilize this information along with the remaining assumptions, driver information, and vehicle information to assess the risk to insure and calculate an estimated price. This feature allows the present invention to service a broad base of potential customers.

In one embodiment, the existing customer data analysis defines assumptions based upon those characteristics applying to at least eighty percent (80%) of the organization's existing customer base. For example, if eighty percent (80%) of the existing customers do not operate motorcycles, this customer characteristic may be used as an assumption for potential customers accessing the website of the present invention.

Although the invention has been described with reference to specific embodiments, this description is not meant to be construed in a limited sense. Various modifications of the disclosed embodiments, as well as alternative embodiments of the invention, will become apparent to persons skilled in the art upon reference to the description of the invention. It is, therefore, contemplated that the appended claims will cover such modifications that fall within the scope of the invention.

We claim:

1. A computer-implemented method of providing pricing information, comprising:
    dynamically updating, at a host computer, an assumption set of customer characteristics comprising at least one assumption derived from customer data, wherein the dynamic updating is based on feedback from a plurality of customers;
    presenting the assumption set to a user at a client computer;
    receiving, at the host computer from the client computer, a set of information from the user, wherein the set of information includes a confirmation of whether each assumption in the assumption set applies to the user;
    conditionally estimating a first price or a second price for a product based on the confirmation, wherein estimating the first price for the product is based on the assumption set, and wherein estimating the second price for the product is based on user-provided information to be used in place of the assumption set; and
    presenting the first or second price to the user at the client computer.

2. The computer-implemented method of claim 1, wherein the product comprises vehicle insurance.

3. The computer-implemented method of claim 1, wherein the assumption set of customer characteristics comprises the user having a good credit rating, the user having an active driver's license, the user having a vehicle worth less than a threshold value, the user having annual vehicular usage less than 12,000 miles per year, and the user seeking to insure a vehicle built according to a set of regulations.

4. The computer-implemented method of claim 1, wherein receiving the set of information from the user comprises receiving information about the user.

5. The computer-implemented method of claim 4, wherein the information about the user comprises driver information, previous insurance coverage, driver identification, and driver history.

6. The computer-implemented method of claim 1, wherein receiving the set of information from the user comprises receiving information about a vehicle to be insured by the user.

7. The computer-implemented method of claim 6, wherein the information about the vehicle comprises a vehicle location, a make & model, and vehicle safety devices.

8. The computer-implemented method of claim 1, wherein the assumption set is derived from customer data based on which assumptions apply to the greatest number of customers.

9. The computer-implemented method of claim 1, wherein the assumption set is derived from customer data based on which assumptions apply to a majority of customers.

10. The computer-implemented method of claim 9, wherein the assumption set is derived from customer data based on which assumptions apply to at least 80% of the customers.

11. A non-transitory machine-readable medium comprising instructions, which when executed by a host computer, cause the host computer to provide pricing information by:
    dynamically updating an assumption set of customer characteristics comprising at least one assumption derived from customer data, wherein the dynamic updating is based on feedback from a plurality of customers;
    presenting the assumption set to a user at a client computer;
    receiving, at the host computer from the client computer, a set of information from the user, wherein the set of information includes a confirmation of whether each assumption in the assumption set applies to the user;
    conditionally estimating a first price or a second price for a product based on the confirmation, wherein estimating the first price for the product is based on the assumption set, and wherein estimating the second price for the product is based on user-provided information to be used in place of the assumption set; and
    presenting the first or second price to the user at the client computer.

12. The non-transitory machine-readable medium of claim 11, wherein the product comprises vehicle insurance.

13. The non-transitory machine-readable medium of claim 11, wherein the assumption set of customer characteristics comprises the user having a good credit rating, the user having an active driver's license, the user having a vehicle worth less than a threshold value, the user having annual vehicular usage less than 12,000 miles per year, and the user seeking to insure a vehicle built according to a set of regulations.

14. The non-transitory machine-readable medium of claim 11, wherein receiving the set of information from the user comprises receiving information about the user, and wherein the information about the user comprises driver information, previous insurance coverage, driver identification, and driver history.

15. The non-transitory machine-readable medium of claim 11, wherein receiving the set of information from the user comprises receiving information about a vehicle to be insured by the user, and wherein the information about the vehicle comprises a vehicle location, a make & model, and vehicle safety devices.

16. The non-transitory machine-readable medium of claim 11, wherein the assumption set is derived from customer data based on which assumptions apply to the greatest number of customers.

17. The non-transitory machine-readable medium of claim 11, wherein the assumption set is derived from customer data based on which assumptions apply to a majority of customers.

18. The computer-implemented method of claim 17, wherein the assumption set is derived from customer data based on which assumptions apply to at least 80% of the customers.

19. A computer system for providing pricing information comprising:
    a storage device configured to store electronic data, wherein the storage device contains an assumption set of customer characteristics comprising at least one assumption derived front customer data; and
    an application server coupled to the storage device and configured to:
        dynamically update the assumption set based on feedback from a plurality of customers;
        present the assumption set to a user at a client computer;
        receive, at the computer system from the client computer, a set of information from the user, wherein the set of information includes a confirmation of whether each assumption in the assumption set applies to the user;
        conditionally estimate a first price or a second price for a product based on the confirmation, wherein estimating the first price for the product is based on the assumption set, and wherein estimating the second price for the product is based on user-provided information to be used in place of the assumption set; and
        present the first or second price to the user at the client computer.

20. The system of claim 19, wherein the product comprises vehicle insurance.

* * * * *